(12) United States Patent
Harrington

(10) Patent No.: US 7,120,871 B1
(45) Date of Patent: Oct. 10, 2006

(54) ENHANCED VIDEO PROGRAMMING SYSTEM AND METHOD UTILIZING A WEB PAGE STAGING AREA

(75) Inventor: Jeffrey M. Harrington, Brooklyn, NY (US)

(73) Assignee: ACTV, Inc., San Francisco, CA (US)

(*) Notice: Subject to any disclaimer, the term of this patent is extended or adjusted under 35 U.S.C. 154(b) by 0 days.

(21) Appl. No.: 09/397,298

(22) Filed: Sep. 15, 1999

(51) Int. Cl.
G06F 15/00 (2006.01)
H04N 7/173 (2006.01)

(52) U.S. Cl. .................. 715/530; 715/513; 715/501.1; 715/500.1; 725/110

(58) Field of Classification Search ............. 715/500.1, 715/501.1, 513, 523, 530; 725/110
See application file for complete search history.

(56) References Cited

U.S. PATENT DOCUMENTS

| | | |
|---|---|---|
| 4,572,509 A | 2/1986 | Sitrick |
| 4,592,546 A | 6/1986 | Fascenda et al. |
| 4,734,764 A | 3/1988 | Pocock et al. |
| 4,877,408 A | 10/1989 | Hartsfield |
| 4,894,789 A | 1/1990 | Yee |
| 4,905,094 A | 2/1990 | Pocock et al. |
| 4,931,865 A | 6/1990 | Scarampi |
| 4,941,040 A | 7/1990 | Pocock et al. |
| 5,014,125 A | 5/1991 | Pocock et al. |
| 5,114,155 A | 5/1992 | Tillery et al. |
| 5,128,752 A | 7/1992 | Von Kohorn |

(Continued)

FOREIGN PATENT DOCUMENTS

AU 717399 7/2000

(Continued)

OTHER PUBLICATIONS

Mannos, T.J.; "Re: Web page prefetching?"; DEJA News, (Online), Dec. 1, 1997; XP002095977 Retrieved from the Internet: <URL:http://dejanews.com> (retrieved on Oct. 4, 2002).

(Continued)

Primary Examiner—Stephen Hong
Assistant Examiner—Thu V. Huynh
(74) Attorney, Agent, or Firm—Morrison & Foerster LLP

(57) ABSTRACT

A web page staging area for construction of web pages hidden from view of the user. Once the web page is constructed, it is displayed to the user based upon timer event information or receipt of a particular command instructing that it be displayed. Use of the staging area provides the user with a more television-like experience in viewing content from the Internet or other source in that the user need not view a web page being constructed on a display device. Use of timer event information for displaying the constructed web page permits synchronization of the web page with associated programming.

29 Claims, 9 Drawing Sheets

U.S. PATENT DOCUMENTS

| | | |
|---|---|---|
| 5,140,419 A | 8/1992 | Galumbeck et al. |
| 5,191,410 A | 3/1993 | McCalley et al. |
| 5,208,659 A | 5/1993 | Rhodes |
| 5,243,528 A | 9/1993 | Lefebvre |
| 5,262,860 A | 11/1993 | Fitzpatrick et al. |
| 5,264,933 A | 11/1993 | Rosser et al. |
| 5,282,028 A | 1/1994 | Johnson et al. |
| 5,285,278 A | 2/1994 | Holman |
| 5,291,486 A | 3/1994 | Koyanagi |
| 5,353,283 A | 10/1994 | Tsuchiya |
| 5,359,510 A | 10/1994 | Sabaliauskas |
| 5,365,346 A | 11/1994 | Abumi |
| 5,438,355 A | 8/1995 | Palmer |
| 5,453,794 A | 9/1995 | Ezaki |
| 5,462,275 A | 10/1995 | Lowe et al. |
| 5,479,268 A | 12/1995 | Young et al. |
| 5,481,542 A | 1/1996 | Logston et al. |
| 5,498,000 A | 3/1996 | Cuneo |
| 5,526,035 A | 6/1996 | Lappington et al. |
| 5,534,913 A | 7/1996 | Majeti et al. |
| 5,537,141 A | 7/1996 | Harper |
| 5,539,471 A | 7/1996 | Myhrvold et al. |
| 5,543,849 A | 8/1996 | Long |
| 5,553,221 A | 9/1996 | Reimer et al. |
| 5,557,316 A | 9/1996 | Hoarty et al. |
| 5,564,073 A | 10/1996 | Takahisa |
| 5,570,295 A | 10/1996 | Isenberg et al. |
| 5,572,442 A | 11/1996 | Schulhof et al. |
| 5,579,055 A | 11/1996 | Hamilton et al. |
| 5,585,858 A | 12/1996 | Harper et al. |
| 5,586,257 A | 12/1996 | Perlman |
| 5,586,937 A | 12/1996 | Menashe |
| 5,589,892 A | 12/1996 | Knee et al. |
| 5,593,349 A | 1/1997 | Miguel et al. |
| 5,603,078 A | 2/1997 | Henderson et al. |
| 5,604,542 A | 2/1997 | Dedrick |
| 5,610,653 A | 3/1997 | Abecassis |
| 5,612,730 A | 3/1997 | Lewis |
| RE35,498 E | 4/1997 | Barnard |
| 5,627,978 A | 5/1997 | Altom et al. |
| 5,633,810 A * | 5/1997 | Mandal et al. .............. 370/431 |
| 5,633,918 A | 5/1997 | Mankovitz |
| 5,637,844 A | 6/1997 | Eiba |
| 5,640,193 A | 6/1997 | Wellner |
| 5,643,088 A | 7/1997 | Vaughn et al. |
| 5,649,284 A | 7/1997 | Yoshinobu |
| 5,659,366 A | 8/1997 | Kerman |
| 5,667,708 A | 9/1997 | Glass et al. |
| 5,668,592 A | 9/1997 | Spaulding, II |
| 5,677,708 A | 10/1997 | Matthews, III et al. |
| 5,679,075 A | 10/1997 | Forrest et al. |
| 5,686,954 A | 11/1997 | Yoshinobu et al. |
| 5,691,986 A | 11/1997 | Pearlstein |
| 5,694,163 A | 12/1997 | Harrison |
| 5,695,400 A | 12/1997 | Fennell, Jr. et al. |
| 5,696,905 A | 12/1997 | Reimer et al. |
| 5,697,844 A | 12/1997 | Von Kohorn |
| 5,710,884 A | 1/1998 | Dedrick |
| 5,724,091 A | 3/1998 | Freeman et al. |
| 5,724,103 A | 3/1998 | Batchelor |
| 5,724,521 A | 3/1998 | Dedrick |
| 5,724,567 A | 3/1998 | Rose et al. |
| 5,729,252 A | 3/1998 | Fraser |
| 5,730,654 A | 3/1998 | Brown |
| 5,734,413 A | 3/1998 | Lappington et al. |
| 5,734,437 A | 3/1998 | Back |
| 5,748,186 A | 5/1998 | Raman |
| 5,748,731 A | 5/1998 | Shepherd |
| 5,757,916 A | 5/1998 | MacDoran et al. |
| 5,758,079 A | 5/1998 | Ludwig et al. |
| 5,759,101 A | 6/1998 | Von Kohorn |
| 5,761,602 A | 6/1998 | Wagner et al. |
| 5,761,606 A | 6/1998 | Wolzien |
| 5,771,307 A | 6/1998 | Lu et al. |
| 5,771,381 A | 6/1998 | Jones et al. |
| 5,774,664 A * | 6/1998 | Hidary et al. ............... 725/110 |
| 5,778,181 A | 7/1998 | Hidary et al. |
| 5,779,549 A | 7/1998 | Walker et al. |
| 5,782,692 A | 7/1998 | Stelovsky |
| 5,793,365 A | 8/1998 | Tang et al. |
| 5,796,393 A | 8/1998 | MacNaughton et al. |
| 5,796,952 A | 8/1998 | Davis et al. |
| 5,801,750 A | 9/1998 | Kurihara |
| 5,813,006 A | 9/1998 | Polnerow et al. |
| 5,818,441 A | 10/1998 | Throckmorton et al. |
| 5,819,261 A | 10/1998 | Takahashi et al. |
| 5,823,879 A | 10/1998 | Goldberg et al. |
| 5,832,496 A | 11/1998 | Anand et al. |
| 5,846,132 A | 12/1998 | Junkin |
| 5,848,373 A | 12/1998 | DeLorme et al. |
| 5,848,396 A | 12/1998 | Gerace |
| 5,848,397 A | 12/1998 | Marsh et al. |
| 5,855,516 A | 1/1999 | Eiba |
| 5,861,881 A | 1/1999 | Freeman et al. |
| 5,867,208 A | 2/1999 | McLaren ..................... 348/13 |
| 5,870,558 A | 2/1999 | Branton, Jr. et al. |
| 5,878,222 A | 3/1999 | Harrison |
| 5,878,223 A | 3/1999 | Becker et al. |
| 5,880,720 A | 3/1999 | Iwafune et al. |
| 5,889,950 A | 3/1999 | Kuzma |
| 5,889,951 A | 3/1999 | Lombardi |
| 5,890,906 A | 4/1999 | Macri et al. |
| 5,890,963 A | 4/1999 | Yen |
| 5,892,909 A | 4/1999 | Grasso et al. |
| 5,894,556 A | 4/1999 | Grimm et al. |
| 5,905,865 A | 5/1999 | Palmer et al. |
| 5,907,322 A | 5/1999 | Kelly et al. |
| 5,907,680 A | 5/1999 | Nielsen |
| 5,912,700 A | 6/1999 | Honey et al. |
| 5,913,040 A | 6/1999 | Rakavy et al. |
| 5,917,725 A | 6/1999 | Thacher et al. |
| 5,918,009 A | 6/1999 | Gehani et al. |
| 5,918,014 A | 6/1999 | Robinson |
| 5,926,179 A | 7/1999 | Matsuda et al. |
| 5,929,849 A | 7/1999 | Kikinis ....................... 345/327 |
| 5,929,850 A | 7/1999 | Broadwin et al. |
| 5,933,822 A | 8/1999 | Braden-Harder et al. |
| 5,940,082 A | 8/1999 | Brinegar et al. |
| 5,940,595 A | 8/1999 | Reber et al. ................. 709/227 |
| 5,941,774 A | 8/1999 | Takemoto et al. |
| 5,947,747 A | 9/1999 | Walker et al. |
| 5,948,040 A | 9/1999 | DeLorme et al. |
| 5,951,636 A | 9/1999 | Zerber |
| 5,954,798 A | 9/1999 | Shelton et al. |
| 5,956,038 A | 9/1999 | Rekimoto |
| 5,961,603 A | 10/1999 | Kunkel et al. |
| 5,973,685 A * | 10/1999 | Schaffa et al. .............. 345/722 |
| 5,978,833 A | 11/1999 | Pashley et al. |
| 5,987,454 A | 11/1999 | Hobbs |
| 5,987,523 A | 11/1999 | Hind et al. |
| 5,999,664 A | 12/1999 | Mahoney et al. |
| 5,999,929 A | 12/1999 | Goodman |
| 6,002,394 A | 12/1999 | Schein et al. |
| 6,005,561 A | 12/1999 | Hawkins et al. |
| 6,006,252 A | 12/1999 | Wolfe |
| 6,009,458 A | 12/1999 | Hawkins et al. |
| 6,012,083 A | 1/2000 | Savitzy et al. |
| 6,018,768 A | 1/2000 | Ullman et al. |
| 6,023,729 A | 2/2000 | Samuel et al. |
| 6,026,375 A | 2/2000 | Hall et al. |
| 6,029,045 A | 2/2000 | Picco et al. |
| 6,029,172 A | 2/2000 | Jorna et al. |
| 6,029,195 A | 2/2000 | Herz |
| 6,044,403 A * | 3/2000 | Gerszberg et al. .......... 709/225 |

| | | |
|---|---|---|
| 6,047,235 A | 4/2000 | Hiyokawa et al. |
| 6,049,821 A | 4/2000 | Theriault et al. |
| 6,055,569 A * | 4/2000 | O'Brien et al. ............. 709/223 |
| 6,057,856 A | 5/2000 | Miyashita et al. |
| 6,058,430 A | 5/2000 | Kaplan |
| 6,061,738 A | 5/2000 | Osaku et al. |
| 6,064,438 A | 5/2000 | Miller |
| 6,065,059 A | 5/2000 | Shieh et al. |
| 6,075,527 A | 6/2000 | Ichihashi et al. |
| 6,080,063 A | 6/2000 | Khosla |
| 6,081,830 A | 6/2000 | Schindler |
| 6,082,887 A | 7/2000 | Feuer et al. |
| 6,094,677 A | 7/2000 | Capek et al. |
| 6,098,085 A | 8/2000 | Blonder et al. |
| 6,101,180 A | 8/2000 | Donahue et al. |
| 6,102,797 A | 8/2000 | Kail |
| 6,102,969 A | 8/2000 | Christianson et al. |
| 6,108,703 A | 8/2000 | Leighton et al. |
| 6,112,181 A | 8/2000 | Shear et al. |
| 6,112,212 A | 8/2000 | Heitler |
| 6,119,165 A | 9/2000 | Li et al. |
| 6,122,647 A | 9/2000 | Horowitz et al. |
| 6,122,658 A | 9/2000 | Chaddha |
| 6,126,547 A | 10/2000 | Ishimoto et al. |
| 6,128,482 A | 10/2000 | Nixon et al. |
| 6,131,120 A | 10/2000 | Reid |
| 6,134,584 A | 10/2000 | Chang et al. |
| 6,138,144 A | 10/2000 | DeSimone et al. |
| 6,141,010 A | 10/2000 | Hoyle |
| 6,144,848 A | 11/2000 | Walsh et al. |
| 6,144,991 A | 11/2000 | England |
| 6,151,626 A | 11/2000 | Tims et al. |
| 6,163,803 A * | 12/2000 | Watanabe ................... 709/217 |
| 6,177,931 B1 | 1/2001 | Alexander et al. |
| 6,182,072 B1 | 1/2001 | Leak et al. |
| 6,182,116 B1 | 1/2001 | Namma et al. |
| 6,192,340 B1 | 2/2001 | Abecassis |
| 6,193,610 B1 | 2/2001 | Junkin |
| 6,199,045 B1 | 3/2001 | Giniger et al. |
| 6,204,842 B1 * | 3/2001 | Fujii ........................... 345/717 |
| 6,205,582 B1 | 3/2001 | Hoarty |
| 6,239,797 B1 * | 5/2001 | Hills et al. .................. 715/784 |
| 6,253,228 B1 | 6/2001 | Ferris et al. |
| 6,260,192 B1 | 7/2001 | Rosin et al. |
| 6,266,649 B1 | 7/2001 | Linden et al. |
| 6,275,705 B1 | 8/2001 | Drane et al. |
| 6,278,942 B1 | 8/2001 | McDonough |
| 6,279,007 B1 | 8/2001 | Uppala |
| 6,288,753 B1 | 9/2001 | DeNicola et al. |
| 6,289,362 B1 | 9/2001 | Van Der Meer |
| 6,292,780 B1 | 9/2001 | Doederlein et al. |
| 6,297,748 B1 | 10/2001 | Lappenbusch et al. |
| 6,298,330 B1 | 10/2001 | Gardenswartz et al. |
| 6,317,722 B1 | 11/2001 | Jacobi et al. |
| 6,317,780 B1 | 11/2001 | Cohn et al. |
| 6,317,791 B1 | 11/2001 | Cohn et al. |
| 6,326,982 B1 * | 12/2001 | Wu et al. .................... 345/718 |
| 6,327,574 B1 | 12/2001 | Kramer et al. |
| 6,330,592 B1 | 12/2001 | Makuch et al. |
| 6,353,933 B1 | 3/2002 | Love |
| 6,366,914 B1 | 4/2002 | Stern |
| 6,389,458 B1 * | 5/2002 | Shuster ....................... 709/213 |
| 6,397,220 B1 | 5/2002 | Deisinger et al. |
| 6,412,011 B1 | 6/2002 | Agraharam et al. |
| 6,424,979 B1 | 7/2002 | Livingston et al. |
| 6,425,012 B1 | 7/2002 | Trovato et al. |
| 6,442,590 B1 | 8/2002 | Inala et al. |
| 6,442,598 B1 | 8/2002 | Wright et al. |
| 6,442,687 B1 | 8/2002 | Savage |
| 6,457,010 B1 | 9/2002 | Eldering et al. |
| 6,460,180 B1 | 10/2002 | Park et al. |
| 6,463,585 B1 | 10/2002 | Hendricks et al. |
| 6,466,929 B1 | 10/2002 | Brown et al. |
| 6,466,969 B1 | 10/2002 | Bunney et al. |
| 6,480,885 B1 | 11/2002 | Olivier |
| 6,486,892 B1 | 11/2002 | Stern |
| RE37,957 E | 1/2003 | Garfield |
| 6,513,069 B1 | 1/2003 | Abato et al. |
| 6,526,041 B1 | 2/2003 | Shaffer et al. |
| 6,571,234 B1 | 5/2003 | Knight et al. |
| 6,577,716 B1 | 6/2003 | Minter et al. |
| 6,578,025 B1 | 6/2003 | Pollack et al. |
| 6,606,657 B1 | 8/2003 | Zilberstein et al. |
| 6,611,872 B1 | 8/2003 | McCanne |
| 6,615,408 B1 | 9/2003 | Kaiser et al. |
| 6,625,624 B1 | 9/2003 | Chen et al. |
| 6,625,647 B1 * | 9/2003 | Barrick et al. .............. 709/224 |
| 6,643,691 B1 | 11/2003 | Austin |
| 6,661,372 B1 | 12/2003 | Girerd et al. |
| 6,698,020 B1 | 2/2004 | Zigmond et al. |
| 6,725,159 B1 | 4/2004 | Krasner |
| 2001/0000537 A1 | 4/2001 | Inala et al. |
| 2001/0003823 A1 * | 6/2001 | Mighdoll et al. ............ 709/200 |
| 2001/0013123 A1 | 8/2001 | Freeman et al. |
| 2002/0056129 A1 | 5/2002 | Blackketter et al. |
| 2002/0112002 A1 | 8/2002 | Abato |
| 2002/0156909 A1 | 10/2002 | Harrington |
| 2002/0188943 A1 | 12/2002 | Freeeman et al. |
| 2002/0194589 A1 | 12/2002 | Sheehan et al. |

FOREIGN PATENT DOCUMENTS

| | | |
|---|---|---|
| DE | 44 27 046 | 2/1996 |
| DE | 44 31 438 | 3/1996 |
| DE | 19545882 | 6/1997 |
| EP | 0 163 577 | 12/1985 |
| EP | 0 314 572 | 5/1989 |
| EP | 0424648 A2 | 5/1991 |
| EP | 0 562 221 | 9/1993 |
| EP | 0 673 164 | 3/1995 |
| EP | 757485 | 2/1997 |
| EP | 0 805 598 | 11/1997 |
| EP | 0 837 609 | 4/1998 |
| EP | 0852443 A | 7/1998 |
| EP | 0 879 536 | 11/1998 |
| EP | 0901284 A | 3/1999 |
| EP | 0952539 A2 | 10/1999 |
| EP | 0 982 943 | 5/2000 |
| EP | 1089201 A1 | 4/2001 |
| EP | 1111914 A | 6/2001 |
| GB | 2 132 856 | 7/1984 |
| GB | 2325537 A | 11/1998 |
| GB | 2327837 A * | 2/1999 |
| GB | 2327837 A | 2/1999 |
| GB | 2 347 055 | 8/2000 |
| GB | 2350213 A | 11/2000 |
| GB | 2356319 A | 5/2001 |
| GB | 2 359 708 | 8/2001 |
| GB | 2 359 958 | 9/2001 |
| JP | 4-127688 | 4/1992 |
| JP | 5176306 | 7/1993 |
| JP | 7-288606 | 10/1995 |
| JP | 7-307813 | 11/1995 |
| JP | 8-8860 | 1/1996 |
| JP | 10-222541 | 8/1998 |
| WO | WO 93/06675 | 4/1993 |
| WO | WO 93/07713 | 4/1993 |
| WO | WO 93/11617 | 6/1993 |
| WO | WO 93/22877 | 11/1993 |
| WO | 94/13107 | 6/1994 |
| WO | 96/07270 | 3/1996 |
| WO | WO 96/08923 | 3/1996 |
| WO | 96/13124 | 5/1996 |
| WO | WO 97/02689 | 1/1997 |
| WO | WO 97/02699 | 1/1997 |
| WO | WO 97/22207 | 6/1997 |

| | | |
|---|---|---|
| WO | 97/27546 | 7/1997 |
| WO | WO 97/29591 | 8/1997 |
| WO | WO 97/33434 A1 | 9/1997 |
| WO | WO-98-23080 A2 | 5/1998 |
| WO | WO-98-29956 A2 | 7/1998 |
| WO | WO-99-44159 A1 | 9/1999 |
| WO | WO 99/45726 | 9/1999 |
| WO | WO 99/50778 | 10/1999 |
| WO | WO-99-55066 A1 | 10/1999 |
| WO | WO 00/14987 | 3/2000 |
| WO | WO 00/36836 | 6/2000 |
| WO | WO 00/36886 | 6/2000 |
| WO | WO 00/43892 | 7/2000 |
| WO | WO 00/43899 | 7/2000 |
| WO | W0-00-045599 A | 8/2000 |
| WO | WO 00/77664 | 12/2000 |
| WO | WO-01-015357 A | 3/2001 |
| WO | WO 02/065252 | 8/2002 |
| WO | WO 02/065318 | 8/2002 |

OTHER PUBLICATIONS

"RealSystem G2 Production Guide," 1998-2000, pp. 75-79.
Eitz, "Combiners for Videotext Signals" Broadcast Technology Reports, translation of vol. 28, No. 6, Nov. 1984, pp. 273-289, XP002182048, Norderstedt, Germany.
"Advanced Television Enhancement Forum Specification (ATVEF)", Comment Draft Version 1.0rl, Feb. 25, 1999, XP002142688.
Dale Cripps, "Web TV over Digital Cable," May 4, 1998;http://web-star.com/hdtvnews/webtvoverdigitalcable.html; pp. 1-4.
Dale Cripps, "Internet TV Advertising," May 8, 1998; http://web-star.com/hdtvnews/internettadvertising.html; pp. 1-3.
Dale Cripps, "Gates, TV, Interactivity, "May 5, 1998; pp. 1-4;http://web-star.com/hdtvnews/gatestvinteractivity.html.
"ICTV" Brochure; copyright 1988 by ICTV; 27 pages.
"TV Navigator" brochure; copyright 1997 by Network Computer, Inc.; 6 pages.
"Worldgate" brochure; copyright 1998 by Worldgate Communications; 12 pages.
Per Einar Dybvik and Hakon W. Lie, "Combining WWW/Mosaic with Realtime Multimedia Conferencing in Distance Education," The Second International WWW Conference '94, Mosaic and the Web, Advance Proceedings, vol. 1, Oct. 17-20, 1994 at 423.
Tak K. Woo et al., "A Synchronous Collaboration Tool for the World-Wide Web," the Second International WWW Conference '94, Mosaic and the Web, Advance Proceedings, vol. 1, Oct. 17-20, 1994, at 315.
Intercast Industry Group, Press Release, "Leaders in PC, Broadcast and Cable Industries Announce Formation of Industry Group to Promote New Digital Medium for the Home PC," Business Wire, Oct. 23, 1995.
The Intercast Industry Group, "Frequently Asked Questions," Fall 1996, pp. 1-7.
Vinay Kumar et al., "A Shared Web to Support Design Teams", Third Workshop on Enabling Technologies: Infrastructure for Collaborative Enterprises, Morgantown, West Virginia, Apr. 17-19, 1994 at 178.
Newsbytes, "Different takes on Wedding TV to Web" NEWSBYTES, 'Online! Mar. 1, 1999, XP002257234 Retrieved from the Internet: <URL:www.exn.ca/Stories/1999/03/01/04.asp>'retrieved on Oct. 9, 2003!* page 1, last paragraph.*
Kieron Murphy, "HyperTV fuses Java with television" JAVA WORLD, 'Online! May 1996, XP00257236 Retrieved from the Internet: <URL:www.javaworld.com/javaworld/jw-05-1996/jw-05-hypertv.html> 'retrieved on Oct. 9, 2003!
Yu et al., "Design And Analysis Of Look Ahead Scheduling Scheme To Support Pause-Resume For Video-On-Demand Applications", Multimedia Systems, vol. 4, No. 4, Jan. 1995, pp. 137-149, XP000576898.
Sandra Beudin, "The Web is not TV, or is it?" DZINE, 'Online! Dec. 31, 1996, XP002257234, Retrieved from the Internet: URL:www.exn.ca/stories/1999/03/01/04.asp> retrieved on Oct. 9, 2003.
Wittig et al., "Intelligent Media Agents in Interactive Television Systems", Proceedings of the International Conference on Multimedia Computing and Systems, Los Alamitos, CA, May 15, 1995, pp. 182-189, XP000603484.
"Funkschau Fachzeitschrift für elektronische Kommunikation", vol. 6/96 of Mar. 1, 1996, pp. 70-75. and English Translation of extract from Funkschau Fachzeitschrift Für elektronische Kommunikation.
Nikkei BP Corp., "Intercast Using Gap Television Signal", Nikkei Electronics, Japan, Dec. 18, 1995, No. 651, p. 106.
Television Society, "Interactive Television Broadcast Using Character Broadcast System, Video Information and Broadcast Technology", Nov. 20, 1995, vol. 11, p. 1482-1487.
Cline et al., "DirectShow RTP Support for Adaptivity in Networked Multimedia Applications", Multimedia Computing and Systems, 1998, Proceedings, IEEE International Conference Jun. 28-Jul. 1, 1998, pp. 13-22.
Philippe Le Hegaret, "Document Object Module (DOM)", Architecture Domain, located at www.w3.org/DOM/ retrieved on Jun. 22, 2001, 2 pages.
S. Gillich et al., "ATVEF Integration with DVB Using IP/MPE," Dec. 20, 1999, retrieved from www.atvef.com/library/atvef-dub-bindingR8.html on Jun. 8, 2001, 5 pages.
J. Steinhorn et al., "Embedded Systems Programming-Enhancing TV with ATVEF," retrieved from www.embedded.com/1999/9910/9910ial.htm on Mar. 28, 2000, 10 pages.
"Enhanced Content Specification,", ATVEF, 1998, retrieved from www.atvef.com/library/specl-la.html. on Mar. 28, 2000, 38 pages.
"Overview," located at www.claria.com/companyinfo/visited on Mar. 1, 2005.

* cited by examiner

SYSTEM DESIGN

SOFTWARE DESIGN

ENHANCED VIDEO PROGRAMMING SYSTEM AND METHOD UTILIZING A WEB PAGE STAGING AREA

REFERENCE TO RELATED APPLICATION

The present application is related to U.S. application of Craig D. Ullman, Michael R. Abato, Jeffrey M. Harrington, and Carl R. Duda, entitled "ENHANCED VIDEO PROGRAMMING SYSTEM AND METHOD FOR PROVIDING A DISTRIBUTED COMMUNITY NETWORK," and filed on even date herewith, which is incorporated herein by reference.

BACKGROUND OF THE INVENTION

Today, the capabilities of computers to provide massive amounts of educational and entertainment information has exploded with the Internet. The Internet has the power to transform society through unprecedented levels of information flow between members. Currently, on-line systems offer a variety of different services to users, including news feeds, electronic databases (either searchable by the user directly on the on-line system, or downloadable to the user's own computer), private message services, electronic newsletters, real time games for play by several users at the same time, and job placement services, to name a few. However, today, most on-line communications occur merely through text. This currently stands in great contrast to the audio/visual presentation of the alternative electronic medium, television. However, it is expected that as multi-media's incessant growth continues, audio/visual programs will proliferate and text will become less and less dominant in the on-line environment. Even though these programs will be introduced, the Internet, will remain essentially user unfriendly due to its very massiveness, organization, and randomness. Simply stated, there is no order or direction in the Internet. Specific pieces of information are many times hard to find, and harder yet, is the ability to put that piece of information into a meaningful context.

Television, on the other hand, has been criticized for being a passive medium—"chewing gum for the eyes," as Fred Allen once observed. Television has always been something you watched, not something you do. Many social critics believe that the passivity television depends on has seeped into our entire culture, turning a nation of citizens into a nation of viewers. While interactive television systems have increased the level of user interaction, and thus, provided greater learning and entertainment opportunities, vast information resources such as databases are inaccessible from such a medium.

What is needed is a means to close the gap between video programming and the information superhighway of the Internet. What is needed is a wider, richer experience integrating audio/visual and textual database elements into an organized unique interactive, educational, entertainment experience. Currently, the Internet is a repository of information on virtually any subject. However, what is needed is a mechanism for combining the user-friendly visual experience of television with the vast information resources of the Internet.

SUMMARY OF THE INVENTION

The system of the present invention combines broadcast television programming and/or video programming which appears on a VHS or Beta tape, CD-ROM, DVD or other medium, or particular content from the Internet, or video programming at a video server (hereinafter "video programming"), with the massive Internet, creating a new and powerful educational and entertainment medium. The system allows consumers to receive more information in a more efficient manner than either television or the Internet alone. Consumers not only can see a news report on television, but they can also read pertinent information about the report, as well as explore related information about the story. The program becomes the introduction to a particular subject, rather than the entire subject itself. The act of viewing a program has now become a more engaging, enriching experience.

The system can also create a more intimate relationship between the viewer and the program. The user might be solving problems or performing virtual experiments on the Internet site that a teacher is discussing in an educational television program. Similarly, the consumer might be solving problems that the fictional characters in a television program must solve. In both cases, the consumer is an active participant in the process, rather than a passive observer.

Instead of an undirected and unfocused exploration of Internet sites, by synching specific Internet pages to the video signal, the system puts the Internet in context. The television program producers now can decide what additional information to offer their audience. This material can now be seen in the context of the television program.

An additional advantage is that consumers don't have to search through the literally hundreds of millions of pages on the Internet to find appropriate material. The material has already been filtered by the program producers and delivered to the consumer automatically.

Another advantage of the system is that it changes the nature of advertising. Since additional information can be given to consumers automatically, advertising can now be more substantive, allowing customers to make more informed choices. Now, the act of purchasing a product seen on television can be streamlined—the consumer can be given the choice of buying the product instantly using the two-way capabilities of the system.

In addition, users can take advantage of the two-way capabilities of the Internet to respond to polls, to send e-mail or to link to additional sites. For example, a viewer watching a television news program, through the system of the invention, can receive a stream of Web pages which provide additional, specific information relating to the news content—whether background on the Presidential primaries or the latest change in interest rates.

The video programming and corresponding Internet pages can be viewed on personal computers equipped with a television card, but the open software-based approach enables anyone with a television set and JAVA enabled PC to experience the system of the invention.

By marrying the appeal of video with the two-way data transfer capabilities of the Internet, the system creates a powerful new medium: Video producers and Internet site creators can enhance their content to extend their brand identity and differentiate their program offerings to the millions of people who are spending more time navigating through the resources of the World Wide Web rather than watching television; advertisers can speak more directly to consumers by directly sending Web pages to the consumer instead of only displaying Web addresses in their commercials; and consumers can gain a new level of interest and interactivity over a video-based medium. In addition to providing significant and immediate benefits to broadcasters and advertisers, the system will also present educational programmers with a way to more effectively use Internet resources in the classroom.

Recently, several media companies have joined to create a system for linking the Internet and television on the personal computer, called "Intercast." In this system, content will be provided simultaneously with the TV video signal. This system, however, requires that stripped down Web pages be sent in the vertical blanking interval (VBI) of the video signal, using up to three scan lines limiting effective bandwidth to approximately 28.8 kbps. This approach, however, requires specialized hardware to both insert the Web pages into the VBI and extract these codes at each PC since it takes up to three scan lines of the VBI. Thus, the complexity and cost of the PC is increased. Because the Web pages are transmitted with the video signal, the Intercast system is not a true "two-way" system, but merely a one-way "piggyback" system. In addition, the Intercast is an analog video product, and thus, cannot handle digital video data.

The system of the present invention, on the other hand, is a much more flexible, but less complex, system. The present invention supports either analog or digital television broadcasts without broadcasters or end-users having to alter their existing systems, thus enabling broadcasters to reach a wide audience within a short time.

In a first embodiment, the actual Web pages are not forced into the very limited bandwidth of the vertical blanking interval (VBI). Instead, merely eight fields of line 21 of the VBI are used to deliver the relevant Internet Web page addresses to the PC. These addresses are called "uniform resource locators" (URLs). The system then directs the particular Web browser to retrieve the identified Web pages from the Internet. Upon receipt of the particular Web page(s), the system syncs the Web page(s) to the video signal, and at the appropriate times, presents the Web pages on one portion of the computer screen with the television video signal, shown in a window on another portion of the screen, and thus, provides the synergistic Internet and television experience. One of the advantages of the system of the present invention is that no specialized chip set need be produced and implemented into the standard PC. Thus, complexity is kept to a minimum.

In one embodiment of the present invention, the VBI is not used to transmit the URLs to the user. In this alternative embodiment, member broadcasters enter the Internet through a member account, and will be provided with a graphical user interface for pre-scheduling Internet addresses, or URLs, for transmission to users at particular times of day. This interface could also be used to transmit real time live transmissions of URLs to users at the same time as a broadcast. The URLs are stored in a "Link File" for later transmission over the Internet to the user at the broadcasters entered time, which corresponds to the broadcast time of an associated program. The timing of URL's could be determined in advance or can be sent out live. This embodiment eliminates the need to place the URLs in the VBI, and also allows the broadcaster to store more than one Link File for transmission to users in different time zones, for example. Further, more than one broadcaster could access the same master schedule if desired, and add or delete certain URLs to personalize the program for their local audiences. Also, personalization can be taken to the single user, or small group of users, by having the system send a different stream of URLs to each user, depending on a unique user profile, for example. Thus, the personalization feature of the present invention allows each user to receive information uniquely relevant to their interests, demographics, history, etc. This embodiment makes the transmission of URLs to the user even less complex than the first embodiment disclosed herein.

In another embodiment of the present invention, a web page staging area is used on a client's machine to construct a web page hidden from view. The machine receives from a server a pre-fetch push command along with a URL and timer event information. A hidden staging frame is set-up in memory for constructing the web page, and a timer is initialized using the timer event information. A web browser uses the URL to retrieve content and construct the web page in the hidden staging frame. After the web page is constructed and the timer expires or other relevant timer event occurs, the web browser retrieves the constructed web page and displays it to the user. Therefore, the user is provided with a more television-like experience in viewing content, as the user need not view the web pages being constructed.

Thus, it is an object of the present invention to provide order and direction to the Internet by using television signals to place, orient and control such information in a meaningful context.

It is an object of the present invention to create a more intimate relationship between the viewer and the program by enriching the learning experience through the provision of more in-depth information.

DETAILED DESCRIPTION

Figure 1:
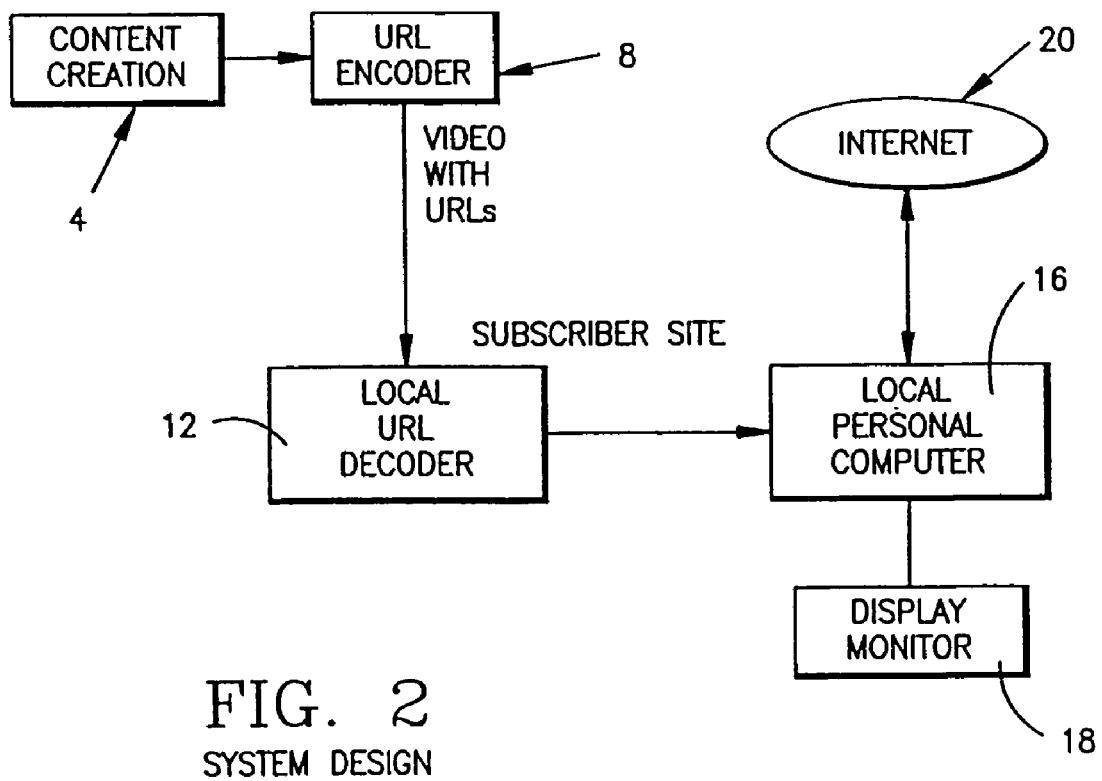
FIG. 1 is a diagram of the system design, showing the receipt and decoding of video signals at the subscriber location using the method of the present invention.

The system of the present invention combines the rich visual capabilities of video with the vast resources of the Internet. As shown in FIG. 1, an embodiment of the invention is a computer based system for receiving a video program along with embedded uniform resource locators (URLs)—which direct the user's computer 16 to address locations, or Web sites, on the Internet 20 to retrieve related Web pages. These Web pages correspond to the video presentation. The particular video programming can be delivered in analog, digital or digitally compressed formats (e.g., MPEG2) via any transmission means, including satellite, cable, wire, television broadcast or sent via the Web.

The video programming is preferably created at a centralized location, i.e., content creation 4 as shown in FIG. 1, for distribution to subscribers in their homes, for example. Program creation is accomplished according to any conventional means known in the art. After a video program is created, uniform resource locators are embedded, in one embodiment, into the vertical blank interval of the video programming by the URL encoder 8, shown in FIG. 1. In this embodiment, the URLs are encoded onto eight fields of line 21 of the VBI. Line 21 is the line associated with close captioning, among other things. However, the URLs could also be embedded in other fields of the VBI, in the horizontal portion of the video, as part of the audio channel, in any subcarrier to the video, or if digital, in one of the data fields.

Although FIG. 1 shows the video with URLs over the same transmission line, the URLs can be sent down independently of the video program on a data channel. In this embodiment, the URLs can be forwarded to the remote sites either prior to initiation or during the program. Preferably, the URLs have associated time stamps which indicate to the subscriber stations when, during the video program, to display the particular Web pages addressed by the URLs. Alternatively, the user can select when to call the particular Web pages for display with the video program.

The particular information in line 21 is not part of the visual part of the program, and thus, is not perceptible to the human eye, thereby making it ideal to send data information to the users. While the bandwidth capacity of line 21 is limited, because the system of the present invention transmits only the uniform resource locators (URLs), and not full Web pages, there is more than enough capacity. Furthermore, no additional hardware is necessary at the PC 16 to implement the elements of the present invention. Thus, the present invention has the additional advantages of being very efficient and takes advantage of conventional hardware.

Once the video program is created, it can be transmitted to user sites over any transmission means, including broadcast, cable, satellite, or Internet, and may reside on video servers. Furthermore, the video program, with or without embedded URLs, can be encoded on a VHS or Beta tape, DVD or other medium.

Preferably, each receiver station comprises any Intel x86 machine (preferably a 486 processor, pentium processor, etc.), an Apple Computer, UNIX or any other type of standard computer workstation. The local PC 16 is preferably connected to either a cable and/or broadcast television connection or to a local VCR or other video source. At each subscriber site, the local personal computer 16 preferably receives the cable transmission by cable connection on the back of the personal computer 16. The video/audio program can then be processed for display on the computer screen using any conventional PC card capable of displaying NTSC signals on a computer monitor, such as a WinTV card. In addition to the cable connection, however, in the present invention there is also an Internet 20 connection created concurrently with the cable connection.

The Internet 20 connection can be via high-speed line, RF, conventional modem or by way of two-way cable carrying the video programming. The local PC 16 has Internet access via any of the current ASCII software mechanisms. In an embodiment, at each subscriber home, an associated local URL decoder 12 receives the cable video television program, as shown in FIG. 1. The local URL decoder 12 extracts the URLs, preferably embedded in the vertical blanking interval, with the use of any conventional VBI decoder device. The URL decoder 12 may be either a stand-alone unit or a card which is implemented into the personal computer 16.

Figure 2:
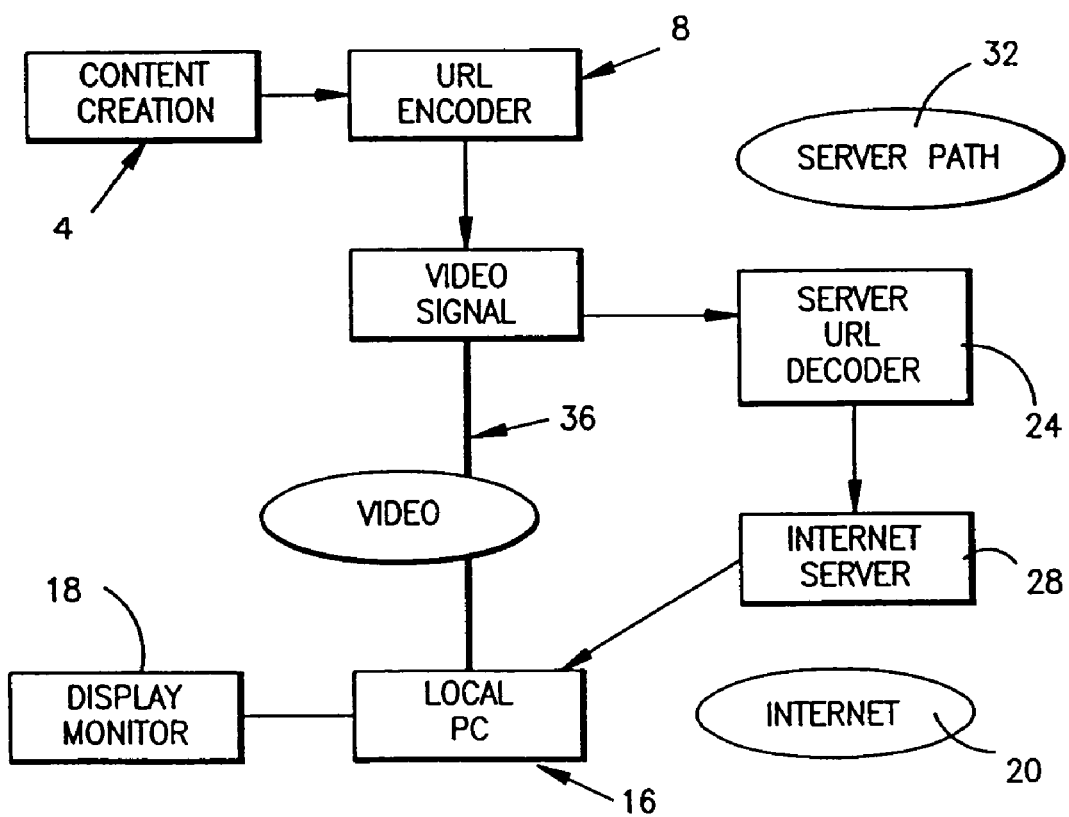
FIG. 2 is a diagram showing an alternative system embodiment to achieve the integration of the Internet information with the video content by decoding the uniform resource locators at a server site and then transmitting the URLs to the subscriber stations via the Internet.

In another embodiment shown in FIG. 2, the uniform resource locators (URLs) are encoded into the video in the same manner as described above. Again, the URLs are preferably encoded onto eight fields of line 21 of the VBI, but may also be sent independently of the video. In this embodiment, the URL decoder 24 is located at the server site, as opposed to the subscriber location. When the decoder 24 receives the video program signal, it strips out the URL codes on line 21 of the VBI and delivers these codes independently to an Internet server 28. The URL code is then subsequently delivered over the Internet 20 to the user PC 16. Simultaneously, the video is broadcast over conventional broadcast or cable transmission means 36 to the user's personal computer 16.

Figure 4:
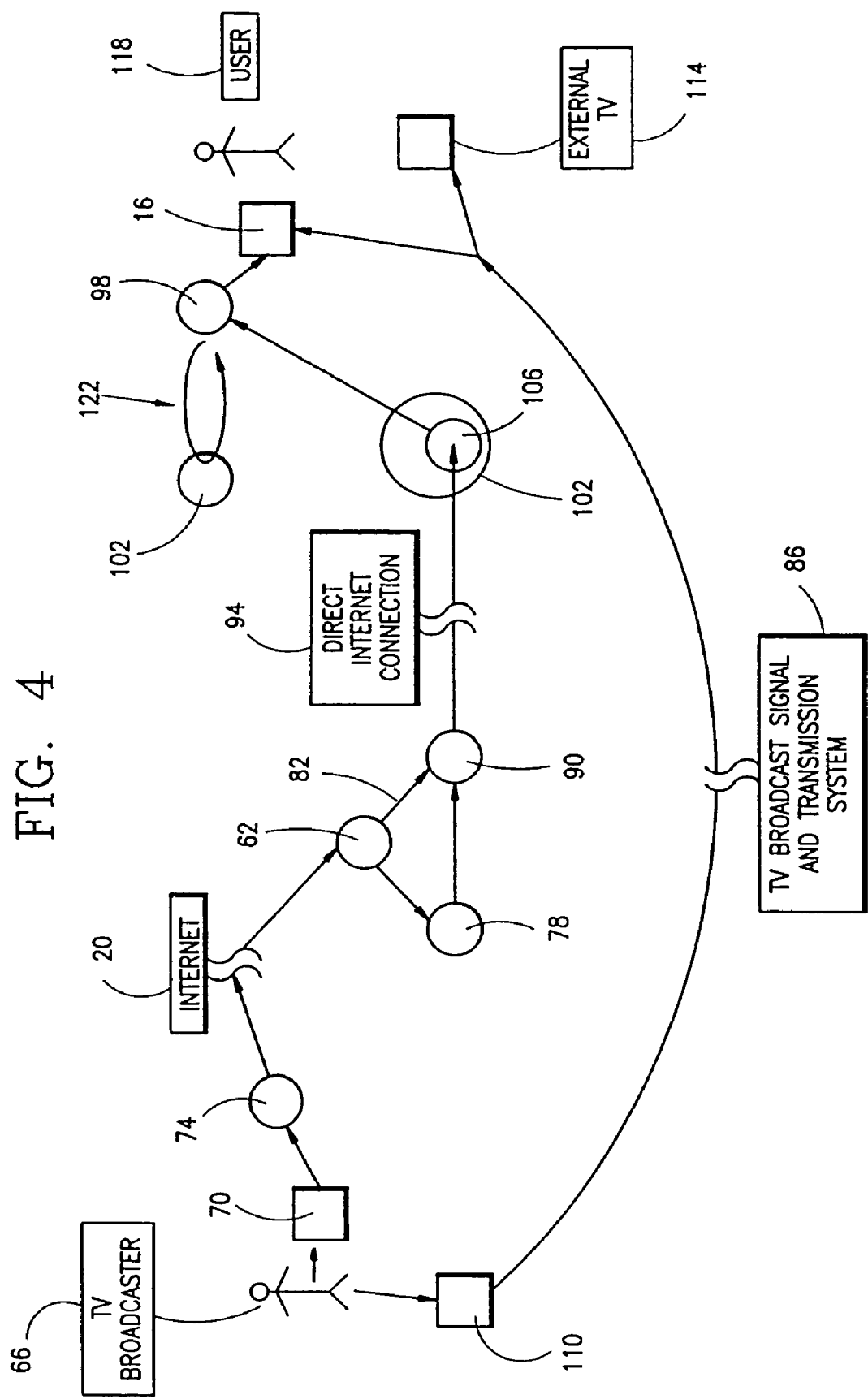
FIG. 4 is a diagram showing another system embodiment to achieve the direct transmission of URLs over the Internet to the user at a broadcaster's entered time without encoding the URLs into the VBI.

Another embodiment of the system, shown in FIG. 4, does not depend on, or even use, the VBI. In this embodiment, the system will run an online service over the Internet 20. This service will be in the form of an Internet Web site 62 that provides a user-interface to a database 78 and to one or more associated data servers 90. The service will provide member-accounts to TV broadcasters 66 who sign up to use the system of the invention in conjunction with their broadcasts. Each member broadcaster will enter the service at their computer 70 through Web browser software 74 using their member account by entering various identification and password information. Once within their account, the member will be provided with a graphical user interface for pre-scheduling URLs for transmission to users 118 over a direct Internet connection 94 at particular times of day. The same user interface, or a variation on it, can be used by broadcasters for live transmission 82 of URLs to users at the same time as a broadcast 86.

For example, one example of this interface might be a scheduling calendar (daily, weekly, monthly, yearly) in which the broadcaster 66 may allocate time periods which coincide with their broadcasts 86, and during which they will send out URLs to their users to link to Web pages. For each time period (for example, a particular hour long period during the day) determined by the broadcaster 66 to be a broadcast period (a period during which they want to transmit URLs that correspond to a television show being broadcast from their TV broadcast facility 110 to the external TV 114 of the user 118 at that time), the broadcaster 66 may then enter a series of URLs into an associated file ("Link File") for transmission over the Internet 20 at that time. This Link File might have a user interface such as a spreadsheet, table, or list, or it could be simply a tab-delimited or paragraph-delimited text-file. As an example, each of the records in the Link File consists of a data structure which could contain information such as:

(<timecode>,<URL>,<label or title>,<additional information>,<additional information>, . . . )

The above data structure is just one example. The records in the Link File preferably specify the time, Internet address (i.e. URL), label (such as an associated name), and some optional additional information, for each Web page the broadcaster 66 desires to launch during a show.

When a broadcaster 66 modifies their calendar and/or the Link File associated with any given time period(s) in their calendar, this information is saved into the database 78 that is attached to the site 62. Each broadcaster 66 may maintain multiple calendars in the database 78 if they broadcast in different time zones, for example.

The database 78 provides the Link File records for upcoming time periods to a server 90, which may be one server or a distributed network of server programs on multiple computers across the network, to be utilized for scaling to large national or global audiences. The server 90 provides the Link File records, including the URLs, to the user's personal computer 16, which is connected via a network. Examples of possible networks include the public Internet 94, a direct private network, or even a wireless network.

One feature of the above embodiment is that one or more broadcasters 66 may utilize the same schedule in the database 78 for their own broadcasts 86 or during the same broadcast. For example, a network broadcaster may develop a master schedule and various affiliate broadcasters may subscribe to that schedule or copy it (in the database) and add or delete specific URLs in the schedule for their local audiences or unique programming. This scheme enables affiliates to insert URLs for local advertisers or local subjects into a sequence of more general URLs provided by their network broadcaster 66. In other words, the affiliate can add links that ride on the network feed and then redistribute it to their local audiences.

The above embodiment can also enable personalization in the form of unique series of URLs specific to each user's unique profile, which is directly sent over the Internet 20 to each user's specific client software 106. This can be achieved from the broadcaster 66 to each individual user 118, or to particular collections of users. To accomplish personalization, the service may send a different stream of URLs to each user's client software program 106. The stream of URLs sent would depend on a user profile stored in the database 78 or the client software program 106, a user profile which is built on demand or over time for each user 118 based on criteria such as the location of the user, choices the user makes while using a client software program 106, or choices the broadcaster 66 makes during a broadcast 86, or automatic choices made by an algorithm (such as a filter) residing on the service 62. Personalization enables each user to receive URLs which are uniquely relevant to their interests, demographics, history, or behavior in the system.

System Operation

Once the URLs have reached the personal computer 16, system operation is similar for all of the embodiments diagramed in FIGS. 1, 2, and 4.

Figure 3:
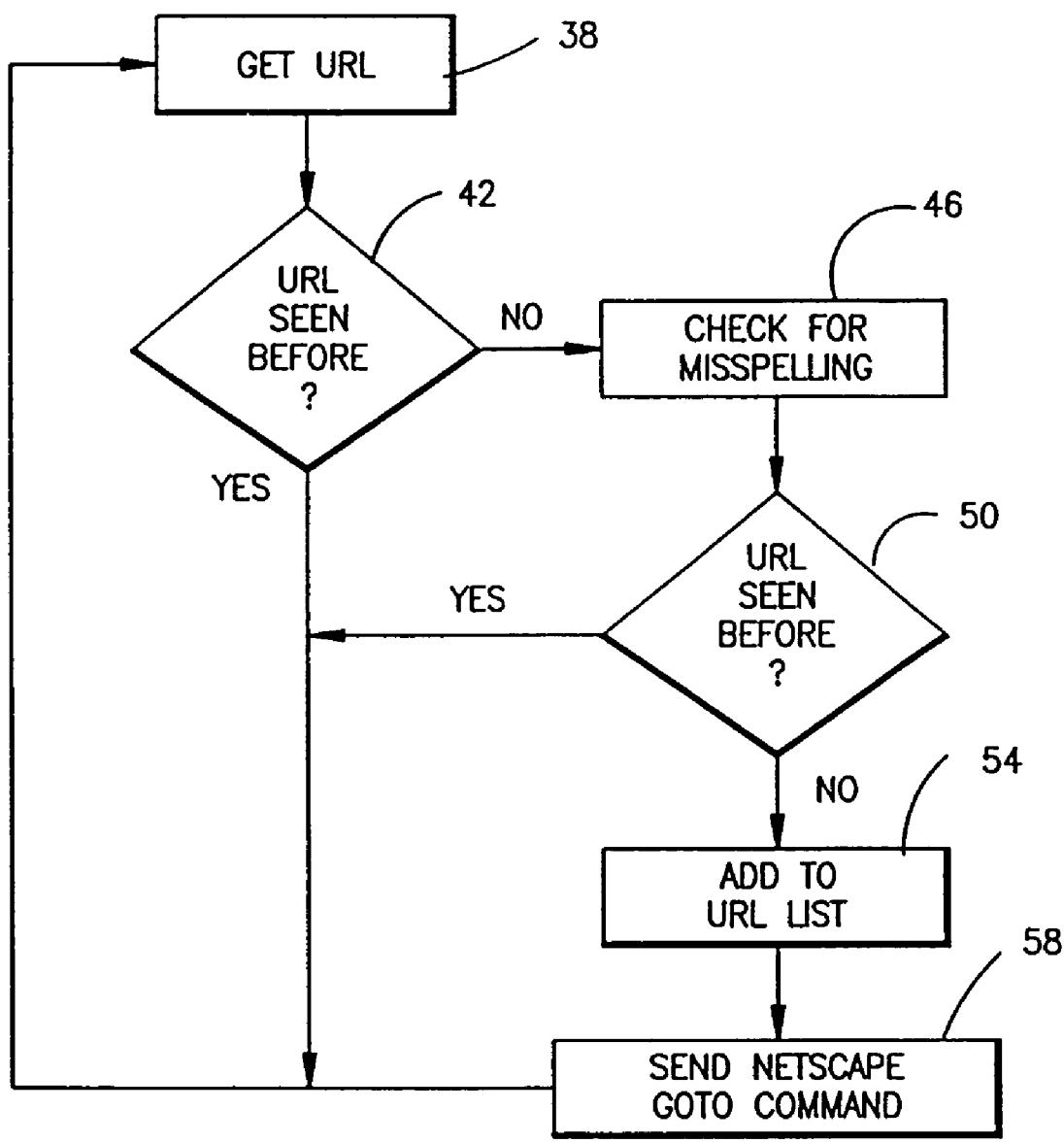
FIG. 3 is a flow diagram of the basic software design of the present invention.

In one embodiment, a JAVA enabled browser 98 as well as specialized software 106 for performing part of the method of the present invention are installed on the computer 16. The JAVA enabled browser 98 allows the computer 16 to retrieve the Web pages 102 and is preferred software, since it is platform independent, and thus, enables efficient and flexible transfer of programs, images, etc., over the Internet 20. The specialized interface software 106 (hereinafter, "client software"), attached as Appendix A, acts as an interface between the video programming and the Internet functions of the present invention. The client software 106 retrieves URLs from the video program (embodiment of FIG. 1) or directly from the Internet connection (embodiments of FIGS. 2 and 4), interprets these URLs and directs the JAVA enabled browser 98 to retrieve the particular relevant Web pages 102, and synchronizes the retrieved Web pages to the video content for display on the user's computer 16, as shown in FIGS. 3 and 4 and explained in more detail below.

In one method, the URLs are encoded and embedded into the video signal by inserting them into the vertical blanking interval (VBI), as mentioned above.

In another embodiment, the URLs are entered by member TV broadcasters 66 along with specified times for transmitting the URLs to the user. At the appropriate times, the URLs are sent directly over the Internet to the user's PC 16 via the client software 106 over a direct point-to-point or multicasting connection.

One method of the present invention has the capability to detect identical URLs sent directly after one another which causes the browser not to fetch URLs in these particular cases. As shown in FIG. 3, once the URL code is received at the computer, the client software 106 first interprets the URL and determines in step 42 whether the particular URL has been received previously. If it has already been received, the next received URL is interpreted for determination of prior receipt. If the particular URL has not been detected before, the software checks for misspelling in step 46 and any other errors, and if errors exist, corrects these particular errors. Once again, it is determined whether the URL has been previously detected. If it has, the next URL is accessed in step 38. If the URL has not been detected, the specific URL is added to the URL list in step 54. The specific URL is then sent to the Web browser, preferably a JAVA enabled browser 98. Upon receipt of the URL, the browser 98, in step 58, will access the Web site address 122 (FIG. 4) indicated by the URL and retrieve the cited Web page(s) 102 via the Internet.

Viewers can view the integrated presentation in the following manner. As mentioned above, the video signal is processed and displayed on a video window on the PC screen using a WinTV card, for example. The corresponding audio is forwarded to the audio card and sent to the PC speakers.

The actual retrieved Web pages 102, referenced by the URL, are optionally time stamped to be displayed on the computer screen when predetermined related video content is displayed in the video window, thus, enlightening and enhancing the video presentation by providing in-depth information related to the video content thereto. Another section on the screen is also preferably used to represent an operational control panel. This control panel provides a list of the URLs that have been broadcast and correspondingly received by the computer 16. This control panel is updated to add a URL code each time a new URL code is received by the PC 16. This list gives the subscriber the flexibility to go back and retrieve particularly informative or interesting Web pages that have already been displayed earlier in the program, or alternatively, to print them out for future reference. Furthermore, the list could include URLs referring to Web pages not displayed with the broadcast program, but that provide further information on a certain topic of interest to the viewer.

The present invention can best be understood with reference to an example. A viewer can begin watching a musical video featuring a new band, for example. As the video is received by the PC 16, URLs are either being received with the video signal or are being received directly via the Internet 20 or another data channel, and are being interpreted by the client software 106. Upon direction and command, the JAVA enabled browser 98 retrieves particular Web pages 102 from Internet 20 Web sites identified in the URLs. These Web pages 102 will then be displayed on the video screen at particular times. Thus, for example, while the viewer is watching the music video, biographical information on the band can also be displayed adjacently to the video window.

Web pages 102 could also include an upcoming concert schedule, or even audio clips of the band's music may be downloaded from the Internet 20. As another example, a user could be watching a program relating to financial news. While the narrator is shown discussing high tech stocks, Web pages corresponding to detailed financial performance information on high tech stocks, environment and characteristics can be displayed with the video on the computer screen. If the personalization features are included, Web pages associated with a particular user's stock can be fetched and displayed on the computer screen with the video program. When the program narrator switches to a discussion on the weekly performance of the Dow Jones, Web pages presenting related financial performance information can be simultaneously displayed. Thus, it is evident that the present invention profoundly enriches the viewing and learning experience.

It is understood that there can exist alternative embodiments for use with the present invention. For example, the user can view the interactive program using a television set 114 or other display monitor in conjunction with the display screen of the personal computer 16. In this embodiment, the relevant Web pages are shown on the personal computer 16 while the video program is displayed on the television monitor 114. In this alternative embodiment, a cable set top box receives the television program from the multichannel cable. The personal computer 16 also receives the video program from the multi-channel cable and extracts the URLs, embedded in the vertical blanking interval of the video signal or directly transmitted 94 over the Internet 20. The client software 106 extracts the URLs and retrieves the particular Web pages as described above. The Web pages are then synchronized with the particular video frames and presented to the user. It is understood that a hyperlink may exist on the Web site that will allow the user to automatically load the client software and call up the specific television channel referenced in the Web site. For example, someone browsing the Internet 20 may come upon a major television network's Web site. They scroll to an interesting story then click on an hyperlink to turn on the software which tunes the TV window to the network to enhance the information residing at the Web site.

Furthermore, instead of receiving the video program from a transmission means, the video program can be addressed directly from the user site if the video program, with or without embedded URLs, is stored on a VHS, Beta, DVD or other medium. In this embodiment, the user PC 16 and/or television 114 are connected to a VCR, DVD player or other appropriate device.

Figure 5:
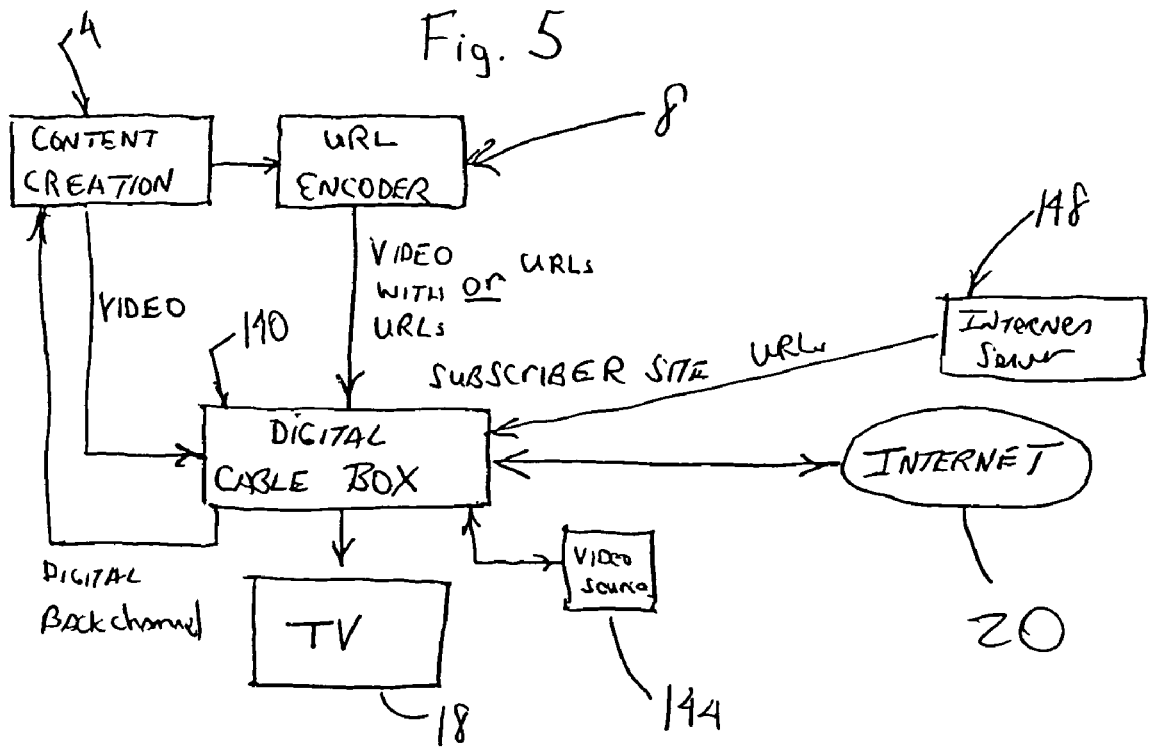
FIG. 5 is a diagram of another embodiment including a digital cable box.
Figure 6:
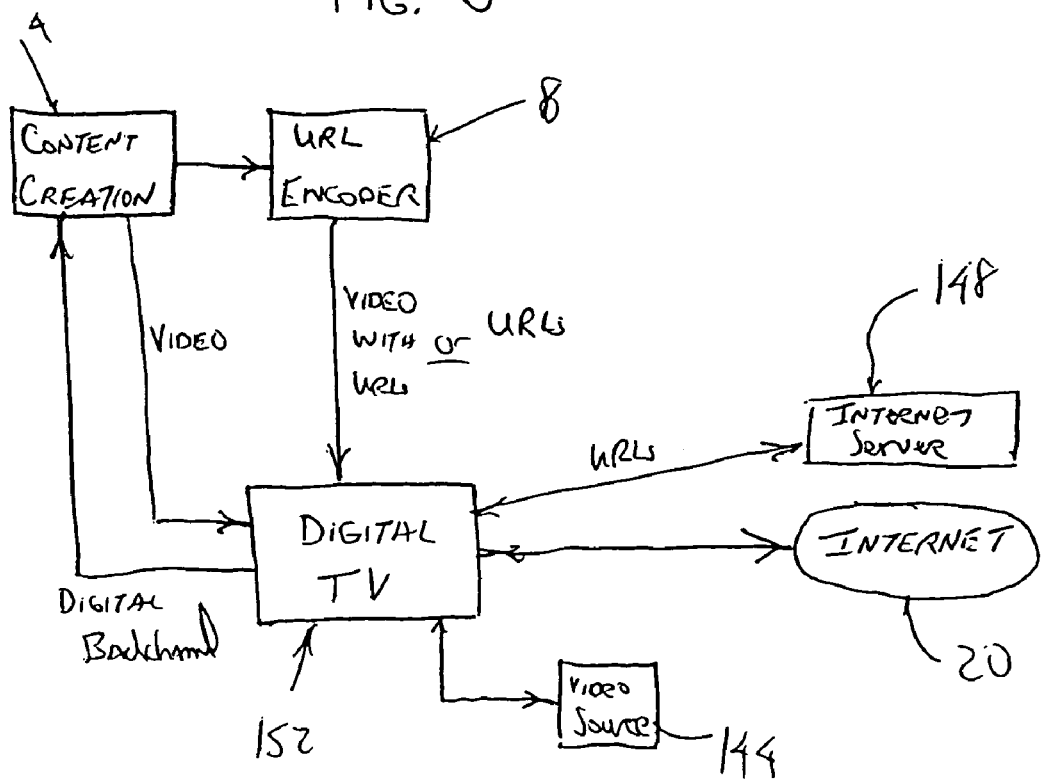
FIG. 6 is a diagram of another embodiment including a digital T.V.

FIGS. 5 and 6 show two alternative embodiments for use with the present invention. For example, the user can view the interactive program using a television set 18 or other display monitor in conjunction with a digital cable box 140, as shown in FIG. 5. In this embodiment, the digital cable box 140 performs the functions of the personal computer 16 shown in FIGS. 1, 2 and 4. In the embodiment shown in FIG. 5, the client software is stored in memory in the digital cable box 140. In one embodiment, the digital cable box 140 includes two tuners, thus allowing both the Web Page and the Video program to be simultaneously viewed on the same screen. If Video and Webstream, however, are carried on one channel, then only one tuner is necessary.

The client software retrieves URLs from the received video program, directly from the Internet connection 20 or via a separate data channel, interprets these URLs and directs the Web enabled browser to retrieve the particular relevant Web pages, and synchronizes the retrieved Web pages to the video content for display on the television 18, as shown in FIG. 5. In this embodiment, the relevant Web pages are preferably shown in one frame of the television 18 while the video program is displayed in another frame. Alternatively, the web page can replace the video program on the display.

In this alternative embodiment, the digital cable set top box 140 receives the television program from the multichannel cable. The URLs can be encoded into the digital program channel using MPEG 1, MPEG2, MPEG4, MPEG7 or any other compression video scheme. Alternatively, the URLs can be transmitted to the digital cable boxes 140 from an Internet server 148. The digital cable box 140 decodes the URLs from the digital video signal or directly transmitted over the Internet 20. The client software decodes the URLs and retrieves the particular Web pages as described above. The Web pages are then preferably synchronized with the particular video frames and presented to the user.

As with all the embodiments described above, instead of receiving the video program from a transmission means, the video program can be addressed directly from a local video source 144 if the video program, with or without embedded URLs, is stored on a VHS, Beta, DVD or other medium. In this embodiment, the digital cable box 140 is connected to a VCR, DVD player or other appropriate device.

FIG. 6 discloses an embodiment where a digital TV 152 is the remote reception unit. In this embodiment, the digital TV 152 performs the functions of the personal computer, shown in FIGS. 1, 2 and 4, and the digital cable box 140 shown in FIG. 5. In the embodiment shown in FIG. 6, a processor means and memory are incorporated into the digital TV 152. Further, the client software and Web browser software are implemented into memory in the digital TV 152. All of the functions described above with reference to the other embodiments are performed in a similar manner by the digital TV 152 embodiment.

Although the digital cable box/TV 140, 18 and digital TV 152, shown in FIGS. 5 and 6, are incorporated into the embodiment of FIG. 1, in substitution for the PC 16, they also could be substituted for the PC 16 shown in FIGS. 2 and 4.

The user can view the video and web content on one screen (in two windows), or with the video on one display screen and the Web content on a separate display monitor. Alternatively, the user can access the video or web content separately. Thus, the user can branch from video to web content and vice versa.

Figure 7:
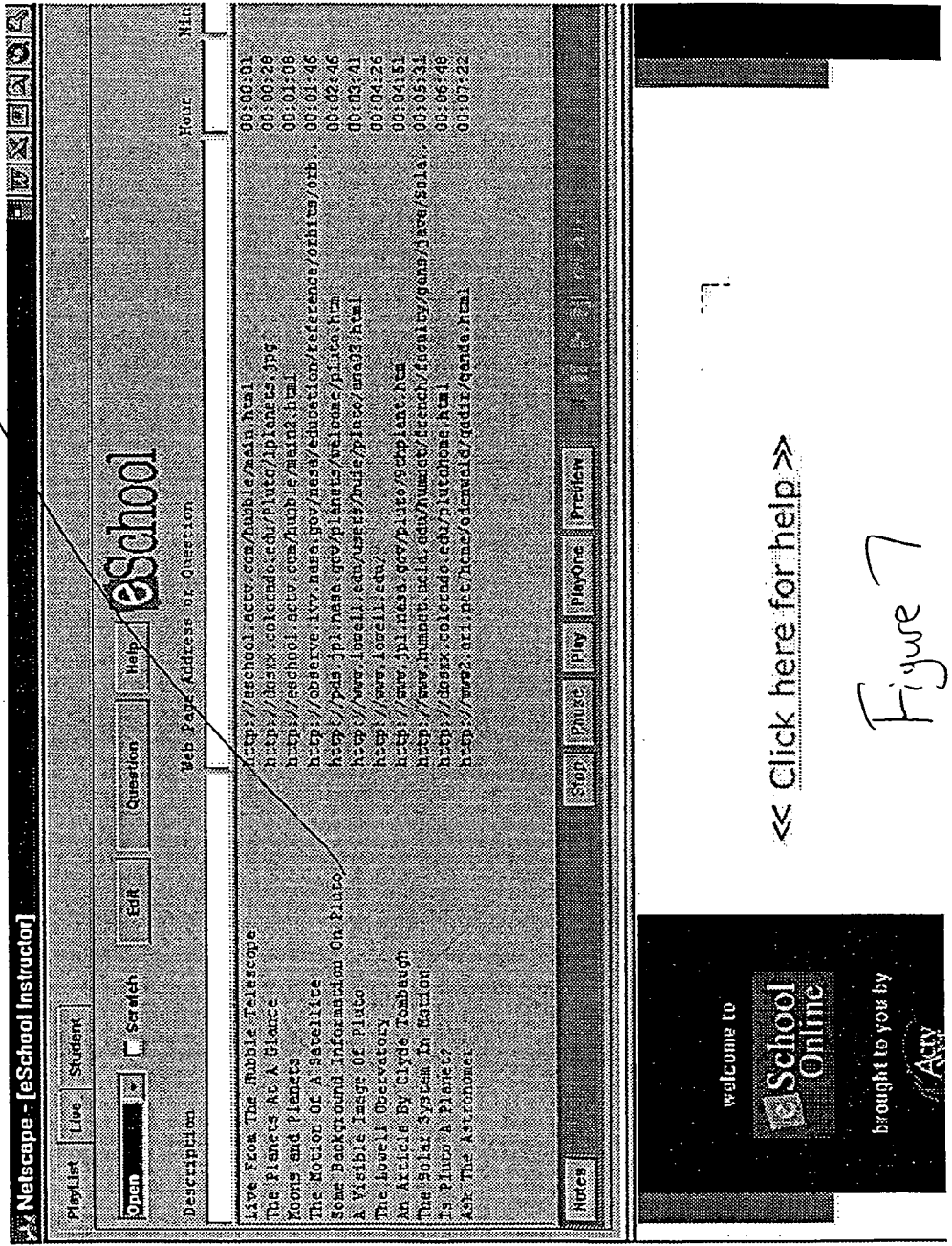

The present invention is well-suited to the education environment. In this embodiment, students and teachers access one or more Web servers. The software components include instructor and student user software, authoring software and database assessment software. In one such embodiment, an instructor uses content creation software on a personal computer to easily integrate into their curriculum current information published on the Web, through an easy to use interface 156 such as that shown in FIG. 7. The instructor creates a playlist (i.e. linkfile) 160, the playlist 160 comprising a listing of Web pages, text notes and questions. The Web sites and questions are set forth in a predetermined order and can be assigned times. Preferably, the URLs identifying the Web site and time stamps are sent automatically to the desktop of each student in the virtual community, either during playback of a pre-recorded program or during a live event.

At each of the student workstations, the program is directed by the playlist 160. In other words, the playlist 160 provides the structure for the program. At predetermined times as dictated by the playlist 160, the browser will go fetch and display a Web page in a frame on the computer screen. Because program events can be set up in this manner at predetermined times, the entire program and playlist can be prerecorded and stored in a Web database for later access by students.

A significant advantage of the present invention for educational applications is that the students and the instructor can be located anywhere, as long as they are all connected to the Web. Because a server is essentially controlling the program, the instructor output comes from the server and the student workstations get automatically updated by the Web server.

Figure 8:
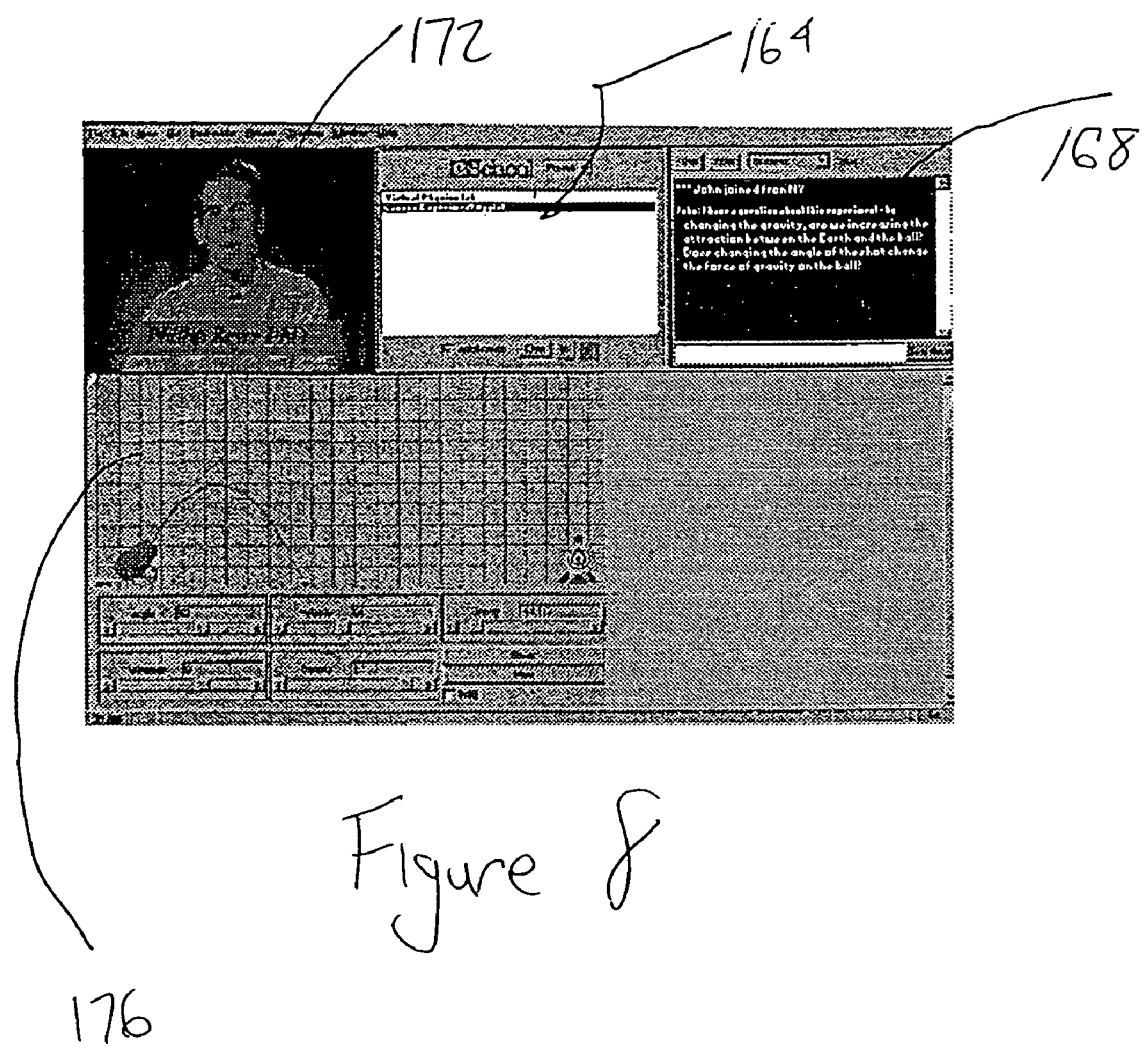
FIG. 8 is a sample display provided to a student of a lesson.

This educational embodiment integrates Web content and other media with collaborative groupware functionality to create an interactive environment for students and teachers. In this embodiment, the student can receive a traditional video lesson through a frame in his or her Web browser, or from a television. Simultaneously, the present invention provides separate frames, an example of which is shown in FIG. 8, in the browser displaying: (1)Web pages 176 automatically delivered to each student's desktop with information or exercises that complement the video presentation; (2) a chat dialogue frame 168 for conversing with the instructor and/or other students online; and (3), an interactive playlist 164 of Web pages and questions comprising the lesson.

In the student interface of FIG. 8, each student can perform a virtual experiment during a physics lesson to learn about gravity, for example. Further, the students are conversing with one another and the instructor in the chat dialogue frame 168. They may also send Web pages to one another and provide answers to questions from the teacher via the chat dialogue frame 168 of the student interface 176. With the chat feature, students may break into subgroups for collaborative learning. Whenever a student in the group sends a message, the message is sent to the Internet server 20 and every other student in the subgroup receives and views the message in their Chat dialogue frame 168.

The instructor, however, may retain control over the chat feature. For example, the instructor can terminate the chat feature or web pushing to terminate unruly on-line conversations or the sending of Web pages by students.

Unlike conventional distance learning systems, systems consistent with the present invention are more powerful by allowing the instructor to freely and conveniently exercise almost any type of testing strategy. The instructor can test students using a combination of the Chat dialogue feature and Web pages. For example, multiple choice questions and short answer questions can appear in the Chat window 168. Essay questions, requiring longer answers, become Web pages. As mentioned above, students can perform virtual experiments on-line. Once the instructor's personal computer receives student answers, student scoring can be presented to the instructor in any format including tables, charts, diagrams, bar graphs, etc. The instructor, thus, can analyze the results and has the capability of providing real-time feedback to the students.

Students can also receive individualized feedback via branched interactive audio, video and/or graphics responses. For example, the workstation may branch to a particular audio response, preferably prerecorded in the instructor's own voice, based on the student response to a multiple choice question. In this embodiment, a plurality of potential audio responses are made available at the student's workstation according to any one of the methodologies set forth in U.S. Pat. No. 5,537,141, entitled DISTANCE LEARNING SYSTEM, herein incorporated by reference. Alternatively, personalized video, audio and graphics segments can be delivered and displayed to the student based on a student answer or personal profile in the manner set forth in U.S. Pat. No. 5,724,091, entitled COMPRESSED DIGITAL DATA INTERACTIVE PROGRAM SYSTEM, herein incorporated by reference.

Responses to student answers can be more substantive based on the memory feature of the present invention. The memory feature is an algorithm that selects an interactive response to the user based not only on the student's current answer selection, but also his or her previous responses, as discussed in the aforementioned applications. The algorithm, preferably stored in memory at each student's workstation and under processor control, merely selects an output interactive response based on student responses. As another example, if a student gets three answers in sequence right, he or she receives a more difficult question. If, however, the student misses one or more of the three questions, he or she receives an easier question.

Figure 9:
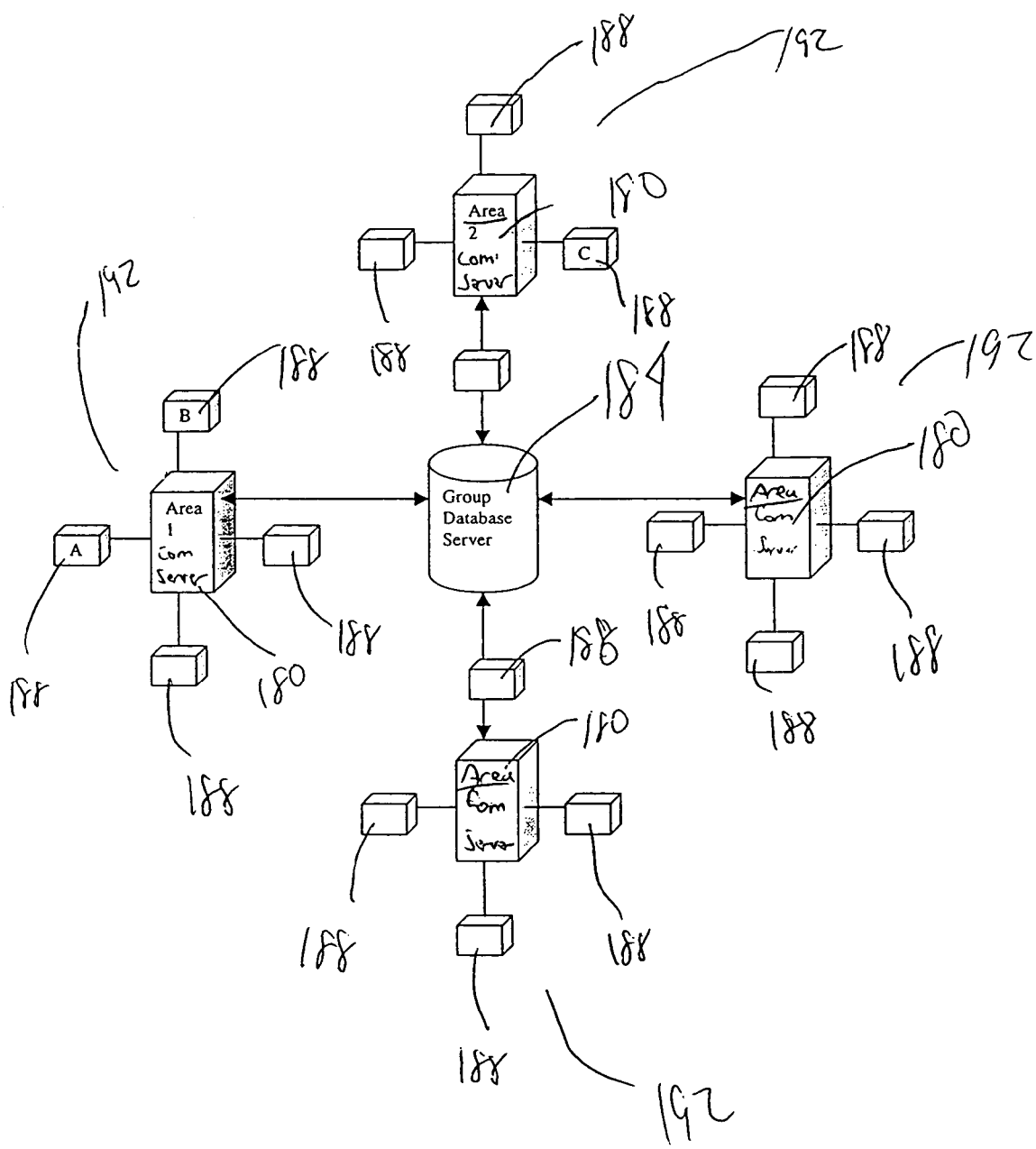
FIG. 9 is a diagram of the distributed Com Server embodiment.

In another embodiment of the present invention, a system is described capable of handling the education requirements of several schools in an efficiently designed network. The system shown in FIG. 9 solves the problems inherent in attempting to service large numbers of users, the most obvious obstacles being the issues of load and performance. In this embodiment shown in FIG. 9, communications servers 180 distribute and route messages across a LAN, WAN and the Internet. Referring to FIG. 9, in the center of the diagram is the Group Database server. Surrounding the database server are several Com Servers 180, each serving an area 192. Surrounding each Com Server 180 are squares representing user stations 188. The Communication Servers 180 are organized in node relationships with one another.

Each node is responsible for serving an Area 192. An Area 192 is defined as a Virtual location serviced by a single Communications Server 180 (or "Com Server"). An Area 192 may be a single school, an office, or may consist of several actual physical locations. The defining characteristic of an Area 192 is that messages sent from one member of an Area 192 to another need not be routed outside of the servicing Corn Server 180.

An Area member is analogous to the frequently used term "user." For example, a "user" may be a student in the educational embodiment described above with reference to FIGS. 7 and 8.

The Distributed Communication System of FIG. 9 shall permit the dynamic addition of Communication Servers 180 within a group with little or no administrative tasks as well as the addition of groups within an overall communications network. A Communication Server group consists of several defined Virtual Areas 192 (preferably, consisting of no more the 250 members each), each area 192 serviced by a single Corn Server 180. This system shall allow members of one Area 192, or group to easily communicate with members of another Area 192 or group without any configuration changes.

Generally, service of very large numbers of users has required large expensive servers and networks. As the user base increases, performance suffers and hardware must be upgraded to service the demand.

The Distributed Communication System of the present invention allows the same, relatively inexpensive machines to serve an ever-increasing user base. The technique by which this will be accomplished will be through the routing of messages from one server to another when necessary.

The method essentially follows the same core pattern as IP routing and DNS lookups. If a message is for a member not belonging to the current Area 192 or group, the message shall be routed through the Distributed Communication System until its destination, or someone who knows the destination and can deliver the message, is found.

The destination will be cached so subsequent messages for that member or group may be more efficiently delivered.

Referring again to FIG. 9, if a message is posted by member "A" and is intended only for the members of group 1 the message shall never leave Area 1 Com Server. However, if the message is intended for members of Area 1 and the members of Area 2, the Area 1 Com server forwards the message to the group database server 184. The message shall be broadcast to the members of Area 1 and tagged in the database 184 as belonging to Area 2. The message is then routed to Area 2 and broadcast to Area 2 members. With this technique any member can potentially send a message to any other member. If the Area Com server 180 does not recognize the destination, the message is forwarded up the line. Each Com server 180 does not need to know about any other server 180. Messages are routed until they delivered. If undeliverable, the original sender is notified.

New Areas 192 can be added on the fly. When a new Com server 188 is added to the network, it registers itself with the database application. Henceforth, any message destined for the new Area 192 can be routed properly without altering the other Area Servers 180.

This method and system works for global messages or for user to user messages. Furthermore, new Groups may also be dynamically added. Once added, each new Group Database Server 184 registers itself with the existing database servers 184. This distribution of load permits nearly unlimited expansion with existing software and hardware. Each server manages a finite number of members, cumulatively serving a growing community.

Users need not be informed as to the particular Com Server 180 they should connect to. Members are directed to a single URL. The selection of the server for user connection is determined by load balancing software. In this manner, the network may appear to be a global network of Servers or simply a local classroom.

The unique aspects of this architecture, using database servers as routing gateways, using techniques resembling IP routing and DNS lookup, enables this system to serve with minimum administration and configuration and with lower end, cost-effective hardware.

Web Page Staging Area

A web page staging area feature permits construction of web pages hidden from view of the user. Once the web page is constructed, it is displayed to the user based upon timer event information or receipt of a particular command that it be displayed. This feature thus provides the user with a more television-like experience in viewing content from the Internet or other source in that the user need not view a web page being constructed on a display device. Use of timer event information for displaying the constructed web page also permits synchronization of the web page with associated programming. For example, the timer event information may be used to trigger display of a web page for an advertisement at the same time as corresponding information is provided by the video programming. The programming, or an associated program, may include, for example, a video program, audio program, multimedia program, combinations of those programs, or other information. The content for the web page may include a wide variety of information such as, for example, advertisements, sports, graphics, music, or any type of multimedia information.

Figure 10:
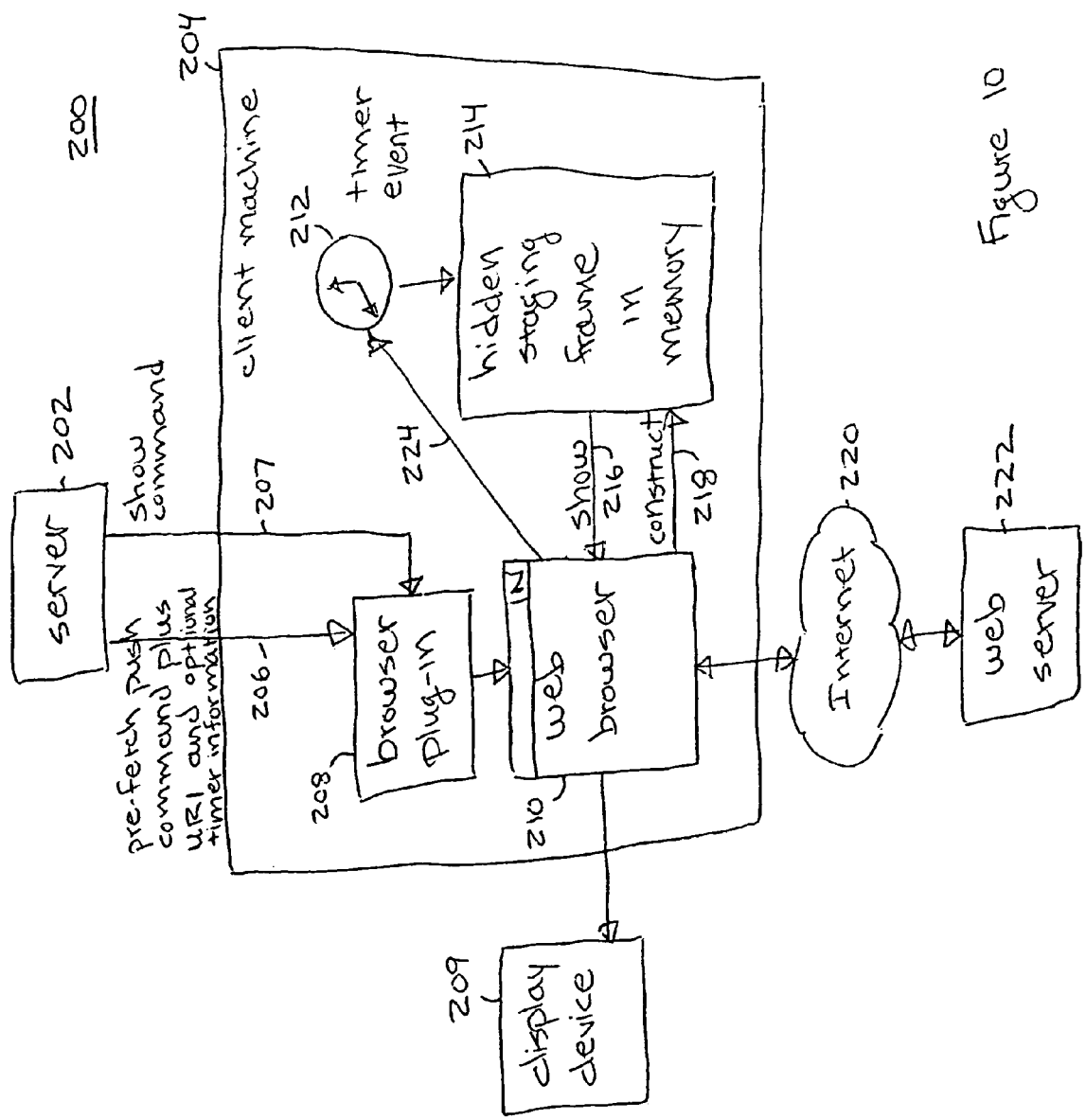
FIG. 10 is a diagram of a system for using a web page staging area.

FIG. 10 is a diagram of a system 200 for using a web page staging area. System 200 includes a server 202 providing commands such as a pre-fetch push command, explained below, and related information to a client machine 204. Client machine 204 includes a web browser 210 and an associated browser plug-in 208. Web browser 210 uses a portion of memory 214 reserved for constructing web pages hidden from view. It also uses a timer event 212, such as a JavaScript timer, for use in determining when to display constructed web pages when timer event information is used. Web browser 210 includes a connection through the Internet 220 or other network to a remote web server 222 for use in retrieving content to construct web pages. Web browser 210 displays content on an associated display device 209.

Client machine 204 may display both the web page along with programming as described above, such as video, audio, or multimedia content. In particular, client machine 204 may be implemented with a personal computer for displaying both the programming and the web page, with a television for displaying both the programming and the web page, or with both a personal computer for displaying the web page and an associated television for displaying the programming. Personal computers may include hardware and software for displaying video and audio programming such as television signals. Also, televisions may include associated hardware with web browsers, such as a set-top converter (digital or analog), for use in retrieving and displaying web pages and other content from the Internet. Therefore, client machine 204 may be implemented with any type of digital display device or device for controlling a digital display device, or combinations of such devices, and examples include a personal computer, a television, a cable box, a satellite box, and a personal digital assistant.

In operation, server 202 transmits a pre-fetch push command with an address and optional timer event information 206 to browser plug-in 208. A pre-fetch push command is used to obtain and assemble content, for example a web page, prior to presentation on an associated machine. The address is used to obtain particular content or other information from web sites or networks such as a local area network, wide-area network, intranet, or the Internet. An example of such an address is a Uniform Resource Identifier (URI). A URI is a compact string of characters for identifying an abstract or physical resource. More specifically, URIs provide a simple and extensible means for identifying a resource, and a URI can be further classified as a locator, a name, or both. The specification of URI syntax and semantics is derived from concepts introduced by the World Wide Web global information initiative.

URIs include, for example, URLs and Uniform Resource Names (URNs). A URL is a subset of a URI that identifies resources via a representation of their primary access mechanism, such as their network "location," rather than identifying the resource by name or other attribute of that resource. The term URN refers to a subset of URI that is required to remain globally unique and persistent even when the resource ceases to exist or becomes unavailable.

Browser plug-in 208 passes the URI and timer event information, if present, to web browser 210, which initializes timer event 212, as shown with connection 224, if timer information is invoked. Browser plug-in 208 also uses the URI to retrieve content for a web page from web server 222. As web browser 210 retrieves the content, it constructs a web page 218 hidden from view in hidden staging frame 214. Upon detecting a time-out by timer event 212, browser plug-in 208 commands web browser 210 to display the constructed web page. Alternatively, if a timer was not invoked, browser plug-in waits for a show command 207 from server 202. In response to time-out by timer event 212 or receipt of show command 207, web browser 210 retrieves the constructed web page from hidden staging frame 214 and displays web page 216 on associated display device 209. Only one hidden staging frame 214 is shown for illustrative purposes only; machine 204 may include many hidden staging frames by, for example, using different reserved portions of memory in order to concurrently construct many web pages hidden from view.

Figure 11:
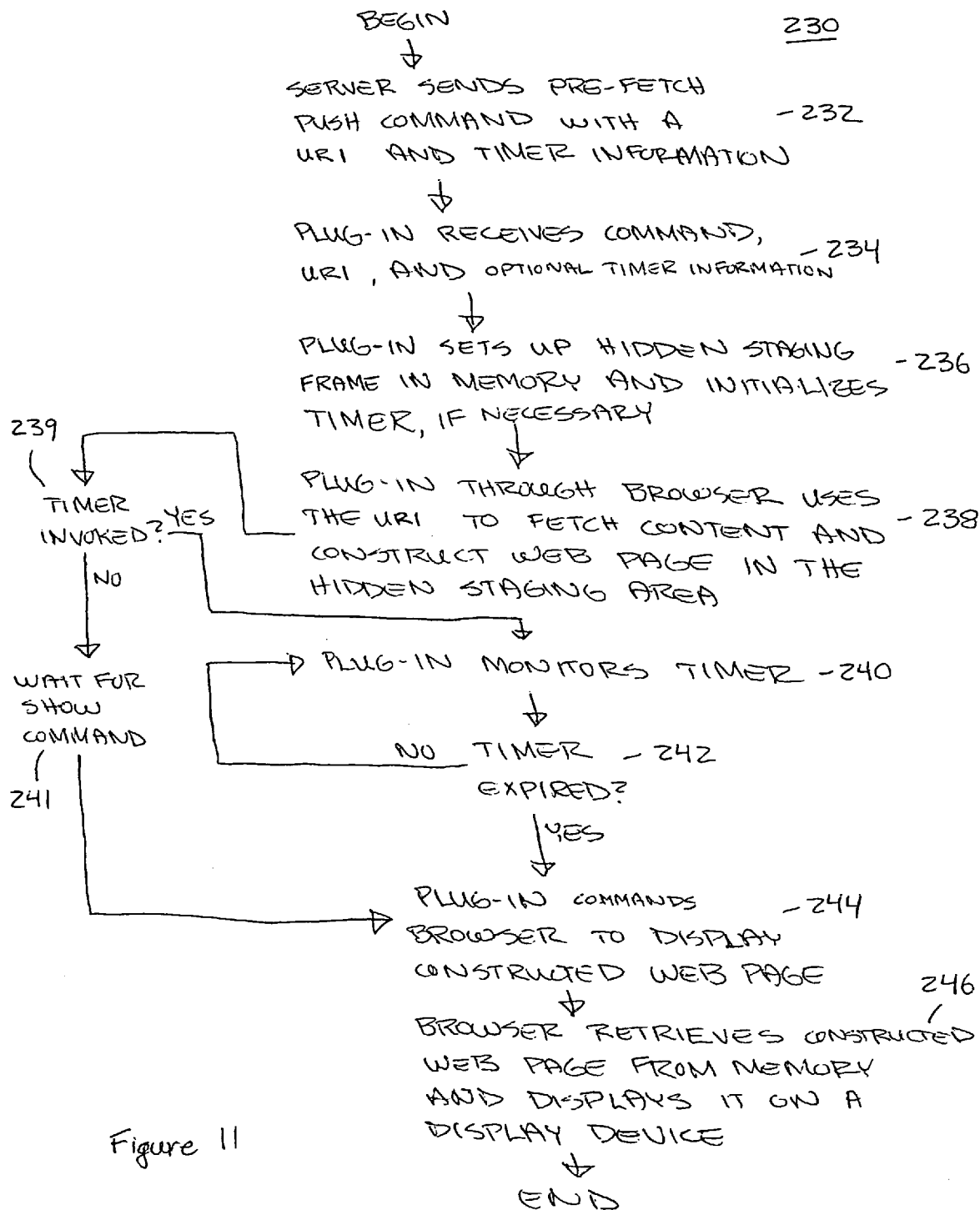
FIG. 11 is a flow chart a method for using a web page staging area.

FIG. 11 is a flow chart of a method 230 further illustrating use of a web page staging area to construct web pages hidden from view. Method 230 may be implemented in software by browser plug-in 208 and web browser 210 controlling operation of client machine 204. In method 230, server 202 sends to client machine 204 a pre-fetch push command along with a URI and optional timer event information (step 232). The pre-fetch push command may include any type of information instructing client machine 204 to construct a web page hidden from view. The URI specifies the network address for obtaining the content for the web page. The timer event information, when used, provides an indication of when to display the constructed web page and it may use a JavaScript timer, or other software or hardware timers. Also, it may provide a relative indication of when to display the web page, such as a particular number of seconds after receiving the command, or it may provide an indication of an actual time at which to display it.

Browser plug-in 208 receives the pre-fetch push command, URI, and optional timer event information (step 234). It sets up hidden staging frame 214 in memory and initializes timer event 212 using the timer event information, if present (step 236). Hidden staging frame 214 may be implemented using a portion of memory in or associated with client machine 204. Browser plug-in 208 may set up the hidden staging frame by reserving a particular portion of memory based upon an expected size of the web page to be constructed, and the size information may be sent by server 202 with the pre-fetch push command. Alternatively, a portion of memory may be reserved in advance for constructing web pages.

Browser plug-in 208 interacts with web browser 210 to construct the web page (step 238). In particular, web browser 210 uses the URI or other address information to retrieve content for the web page from web server 222 through the Internet 220 or other network. As web browser 210 retrieves the content, it constructs the web page 218 in hidden staging frame 214 so that the user does not view the web page being constructed. The construction involves retrieving and locally compiling content for the page for presentation of page when completed. For presentation of the page in a web browser on a computer display device, the construction involves assembling the content for display in the browser. If the web browser operates in a different environment, such as with a video program, the construction may also involve reframing the content for display with the program. Although only web server 222 is shown for providing the content, web browser 210 may obtain the content for the web page from server 202 or from multiple sources.

Browser plug-in 208 determines if a timer was invoked through transmission of timer information with the pre-fetch push command (step 239). If a timer was invoked, browser plug-in 208 through web browser 210 monitors timer event 212 to determine when to display the constructed web page (step 240). In particular, it determines if timer event 212 has expired (step 242). If a timer was not invoked, browser plug-in 208 waits for show command 207 from server 202 (step 241). Upon detecting a time-out (step 242) or receiving show command 207 (step 241), browser plug-in 208 commands web browser 210 to display the constructed web page (step 244). Instead of using a time-out feature as timer information, browser plug-in 208 may use other types of time indications for determining when to display the web page such as displaying it at a particular time.

Based upon the command from browser plug-in 208, web browser 210 retrieves the constructed web page 216 from hidden staging frame 214 and displays it on associated display device 209 (step 246). Accordingly, the user is presented with a constructed web page at a particular time or in response to a particular command, and potentially corresponding to programming also presented to the user. Although browser plug-in 208 and web browser 210 are described as constructing one web page in method 230, they may concurrently execute method 230 for construction and display of multiple web pages at the same time or at least partially overlapping times.

Display device 209 may concurrently display both a program and web browser 210 for presenting the constructed web page. In particular web browser 210 may be displayed in a window or frame overlayed on the program, referred to as a picture-in-picture presentation. In this case, the content for web browser 210 is combined with the program to generate one signal containing the overlayed browser window and content in the program. Client machine 204 may receive the program from server 202 or from other sources, such as television, broadcast television, cable, satellite, local video, and local digital versatile disk (DVD). The local content may be stored on the hard disk drive of client machine 204.

Many uses of a web page staging area are possible, and following provides an example of how it may used in conjunction with a sporting event. For instance, before the coin toss of a professional football game, a producer decides that he wants to send the users a game in the form of a JAVA applet that will require a certain amount of time to download. He also decides that he wants to send a web page of a graphic of historic fumbles that decided past games between the two teams participating in the game. The producer pushes the JAVA applet from server 202 to the user's web page staging area in machine 204, and to any other participating users, along with a Javascript timer embedded in the page in order to have it launch precisely at the start of the football game.

In addition, the producer sends a fumbles graphic to the user's web browser 210 in another hidden frame and to the other users' web browsers. However, the producer does not know exactly when he wants to show that page to the viewers on line, and he does not include a Javascript timer in that page. When the game starts, the JAVA game applet automatically appears at the kickoff on the users' display devices such as display device 209. A few minutes later, one of the players fumbles. The producer then sends a command to all the web staging areas on the client machines to display the fumbles graphic in the users' web browsers such as web browser 210 in machine 204.

Using the foregoing embodiments, methods and processes, the system of the present invention creates a synergistic experience combining the vast resources of the Internet with the presentation capabilities of television.

The invention claimed is:

1. A method of constructing a web page and presenting the constructed web page on a display device comprising:
   displaying an audio-visual program;
   receiving a pre-fetch push command to retrieve the web page, including an address for use in retrieving information to construct the web page;
   retrieving the information using the address;
   constructing the web page in a hidden staging frame prior to display on the display device in order to produce the constructed web page;
   and commanding the constructed web page be displayed on the display device based upon timer event information transmitted with the pre-fetch push command or a show command,
   and wherein the web page is related to the audio-visual program.

2. A method of constructing a web page as described in claim 1 wherein the receiving step comprises receiving timer event information providing an indication of when to command the web page be displayed on the display device, and the commanding step comprises commanding the constructed web page be displayed based upon the timer event information.

3. A method of constructing a web page as described in claim 2 wherein the timer event information comprises a particular amount of time after receiving the pre-fetch push command at the expiration of which a trigger is generated to actuate the commanding step.

4. A method of constructing a web page as described in claim 2 wherein the constructed timer event information comprises a particular time at which a trigger is generated to actuate the commanding step.

5. A method of constructing a web page as described in claim 1 wherein the step of commanding further comprises the step of receiving a show command instructing that the constructed web page be displayed.

6. A method of constructing a web page as described in claim 5 wherein the step of receiving a command comprises receiving a program concurrent with receipt of the command instructing that the constructed web page be displayed.

7. A method of constructing a web page as described in claim 6 wherein the program comprises a video program, audio program, or multimedia program.

8. A method of constructing a web page as described in claim 6 wherein the commanding step further comprises the step of transmitting the program and the constructed web page to the display device for simultaneous display.

9. A method of constructing a web page as described in claim 8 wherein the display device is a television.

10. A method of constructing a web page as described in claim 8 wherein the transmitting step transmits the constructed web page for display to be overlaid on at least a portion of the display of the program.

11. A method of constructing a web page as described in claim 6 wherein the commanding step further comprises the step of transmitting the program for display on a television and transmitting the constructed web page for display on the display device.

12. A method of constructing a web page as described in claim 1 wherein the address comprises a uniform resource identifier.

13. A method of constructing a web page as described in claim 1 wherein the constructing step comprises constructing the web page in a memory module.

14. A method of constructing a web page as described in claim 1 wherein the retrieving step comprises using a web browser to retrieve the information.

15. A method of constructing a web page as described in claim 1 wherein the receiving, retrieving, constructing, and commanding steps are performed by a personal computer, a television, a cable box, a satellite box, a radio, a telephone, a telephone answering device, a wireless telephone device, a wireless Internet device, a telephone device for the deaf, or a personal digital assistant.

16. A method of constructing a web page as described in claim 1 wherein the retrieving step comprises retrieving advertising, sports, or music content.

17. An apparatus for constructing a web page and presenting the constructed web page on a display device comprising:
   a display for displaying an audio-visual program;
   a receiver module for receiving a pre-fetch push command to retrieve the web page, including an address for use in retrieving information to construct the web page;
   a retrieving module for retrieving the information using the address;
   a construction module for constructing the web page in a hidden staging frame prior to its display on the display device in order to produce the constructed web page; and
   a display generation module for displaying the constructed web page on the display device based upon timer event information transmitted with the pre-fetch push command or a show command,
   and wherein the web page is related to the audio-visual program.

18. An apparatus for constructing a web page as described in claim 17 further comprising a timer event module for receiving timer event information and providing an indication of when to trigger the release of the constructed web page for display on the display device, and wherein the display generation module displays the constructed web page based upon the trigger.

19. An apparatus for constructing a web page as described in claim 18 wherein the timer event information comprises a particular amount of time after receiving the pre-fetch push command at the expiration of which the timer event module triggers the display generation module to display the constructed web page.

20. An apparatus for constructing a web page as described in claim 17 wherein the receiver receives a show command instructing the apparatus to display the constructed web page.

21. An apparatus for constructing a web page as described in claim 20 wherein the receiver module receives a program concurrent with receipt of the command that the constructed web page be displayed.

22. An apparatus for constructing a web page as described in claim 21 wherein the program comprises a video program, audio program, or multimedia program.

23. An apparatus for constructing a web page as described in claim 21 wherein the display generation module displays the program and the constructed web page simultaneously on the display device.

24. An apparatus for constructing a web page as described in claim 23 wherein the display device is a television.

25. An apparatus for constructing a web page as described in claim 23 wherein the display generation module displays the constructed web page by overlaying it on at least a portion of the display of the program.

26. An apparatus for constructing a web page as described in claim 21 wherein the display generation module displays the program on a television and displays the constructed web page on the display device.

27. An apparatus for constructing a web page as described in claim 17 wherein the address comprises a uniform resource identifier.

28. An apparatus for constructing a web page as described in claim 17 further comprising a memory for storing the constructed web page prior to its display on the display device.

29. An apparatus for constructing a web page as described in claim 17 wherein the retrieving module further comprises a computer readable program code means comprising a web browser program to retrieve the information.

* * * * *